(12) United States Patent
Chendamarai Kannan et al.

(10) Patent No.: US 12,156,250 B2
(45) Date of Patent: Nov. 26, 2024

(54) TRIGGER-BASED JOINT TX-RX SENSING FOR CHANNEL ACCESS

(71) Applicant: QUALCOMM Incorporated, San Diego, CA (US)

(72) Inventors: Arumugam Chendamarai Kannan, San Diego, CA (US); Jing Sun, San Diego, CA (US); Vinay Chande, San Diego, CA (US); Xiaoxia Zhang, San Diego, CA (US); Tao Luo, San Diego, CA (US); Srinivas Yerramalli, Hyderabad (IN); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 17/322,363

(22) Filed: May 17, 2021

(65) Prior Publication Data

US 2021/0360696 A1 Nov. 18, 2021

Related U.S. Application Data

(60) Provisional application No. 63/026,600, filed on May 18, 2020.

(51) Int. Cl.
*H04W 74/0816* (2024.01)
*H04W 24/08* (2009.01)
(Continued)

(52) U.S. Cl.
CPC ....... *H04W 74/0816* (2013.01); *H04W 24/08* (2013.01); *H04W 28/26* (2013.01);
(Continued)

(58) Field of Classification Search
CPC . H04W 74/0816; H04W 24/08; H04W 28/26; H04W 72/0446; H04W 72/14; H04W 74/0825
(Continued)

(56) References Cited

U.S. PATENT DOCUMENTS

| | | | | |
|---|---|---|---|---|
| 2008/0144493 | A1* | 6/2008 | Yeh ................. | H04W 74/0816 370/230 |
| 2011/0222398 | A1* | 9/2011 | Ribeiro ............. | H04W 74/0816 370/230 |

(Continued)

OTHER PUBLICATIONS

"Chapter 4. 802.11 Framing in Detail" of "802.11 Wireless Networks: The Definitive Guide, 2nd Edition", p. 15-19, by Matthew S. Gast, Apr. 2005 (Year: 2005).*

*Primary Examiner* — Xuan Lu
(74) *Attorney, Agent, or Firm* — QUALCOMM Incorporated

(57) ABSTRACT

A user equipment (UE) and base station may be configured to implementing trigger-based joint TX-RX sensing for channel access. In some aspects, the UE may monitor, via a receiver, for one or more transmissions from a first base station, detect, during the monitoring, interference associated with a pre-grant communication, the pre-grant communication associated with a future communication between a second base station a second user equipment, and transmit, via a transmitter, a reservation communication to the second base station in response to the pre-grant communication. In some aspects, the UE may receive the one or more communications from the first base station, without interference from the second base station, based on transmitting the reservation communication.

22 Claims, 15 Drawing Sheets

(51) Int. Cl.
    *H04W 28/26*     (2009.01)
    *H04W 72/0446*     (2023.01)
    *H04W 72/23*     (2023.01)
    *H04W 74/0808*     (2024.01)

(52) U.S. Cl.
    CPC ....... *H04W 72/0446* (2013.01); *H04W 72/23* (2023.01); *H04W 74/0825* (2013.01)

(58) Field of Classification Search
    USPC .......................................................... 370/329
    See application file for complete search history.

(56) References Cited

U.S. PATENT DOCUMENTS

| | | | |
|---|---|---|---|
| 2014/0269524 A1* | 9/2014 | Xiao | H04L 5/0053 |
| | | | 370/329 |
| 2017/0013470 A1* | 1/2017 | Sun | H04W 74/0816 |
| 2018/0035463 A1* | 2/2018 | Mallik | H04W 16/14 |
| 2018/0167848 A1* | 6/2018 | Lei | H04W 72/0453 |
| 2018/0343588 A1* | 11/2018 | Sadek | H04W 28/26 |
| 2021/0058967 A1* | 2/2021 | Oteri | H04W 72/042 |
| 2021/0204322 A1* | 7/2021 | Lou | H04W 74/004 |
| 2022/0240284 A1* | 7/2022 | Zhou | H04W 52/0225 |

* cited by examiner

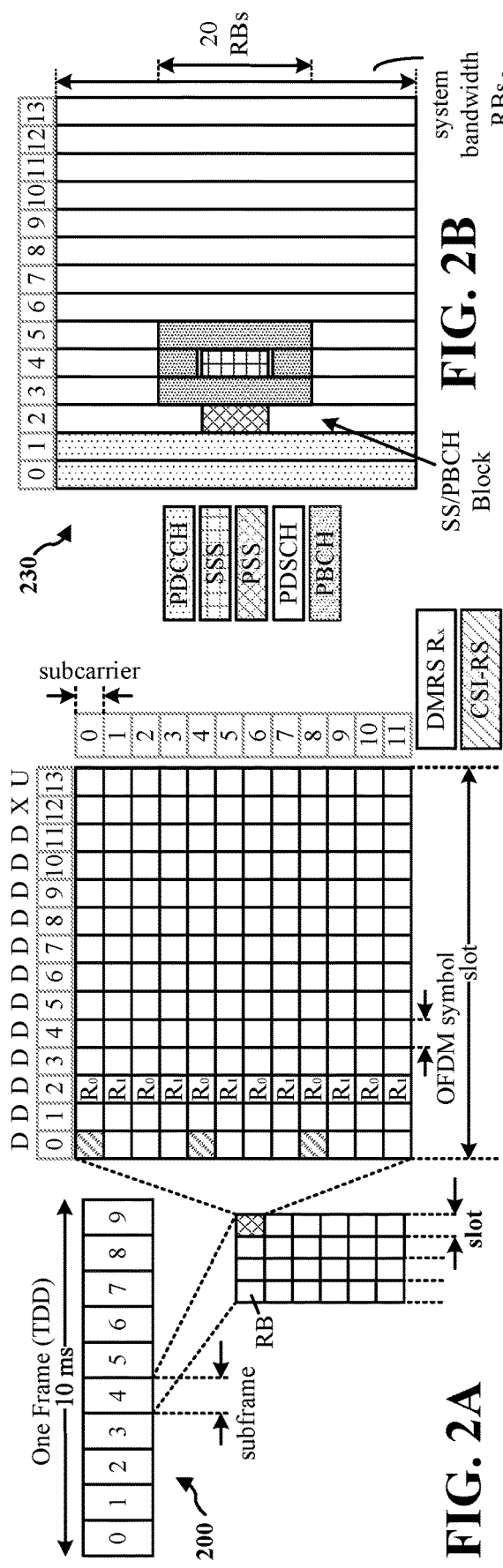
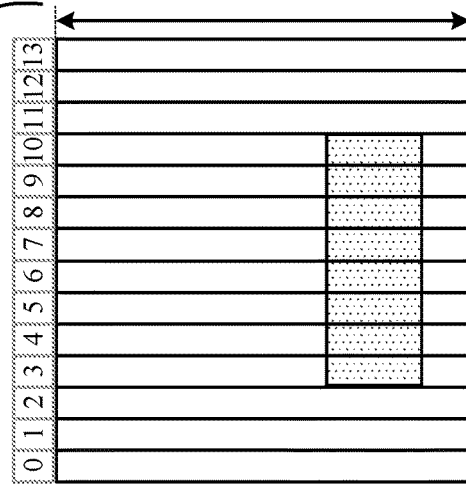
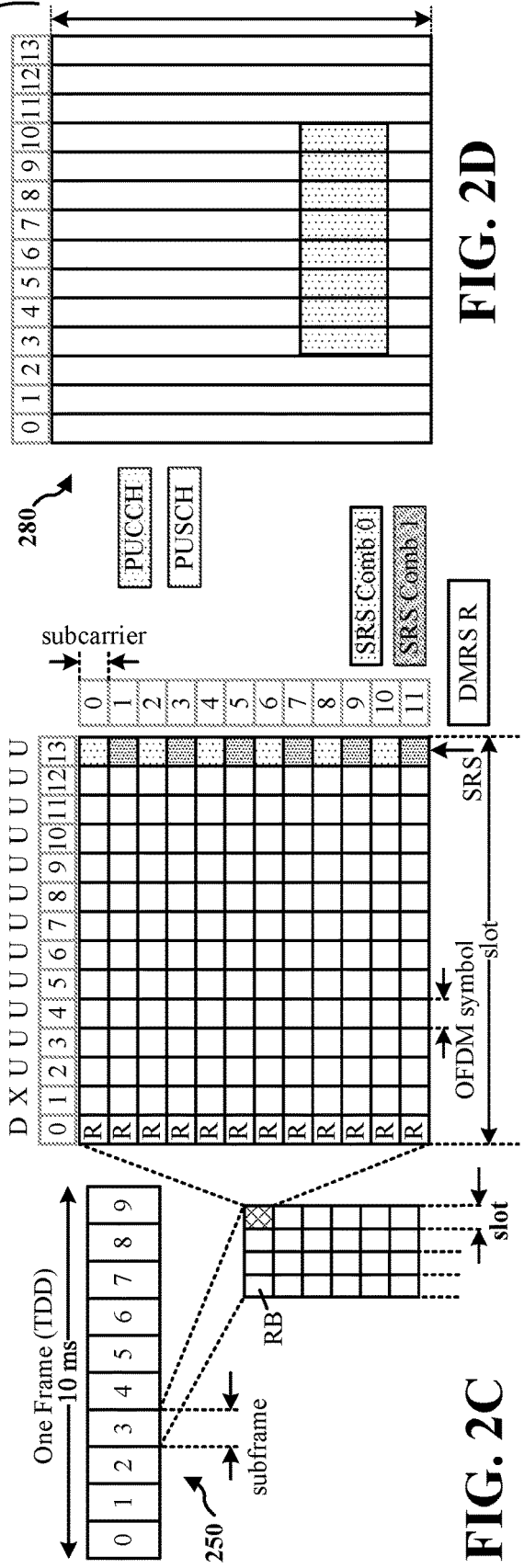
FIG. 2A  FIG. 2B  FIG. 2C  FIG. 2D

TRIGGER-BASED JOINT TX-RX SENSING FOR CHANNEL ACCESS

CROSS-REFERENCE TO RELATED APPLICATION

This application claims priority to U.S. Application No. 63/026,600, entitled "TRIGGER-BASED JOINT TX-RX SENSING FOR CHANNEL ACCESS," filed on May 18, 2020, the disclosure of which is incorporated by reference herein in its entirety.

BACKGROUND

Technical Field

The present disclosure relates generally to communication systems, and more particularly, to wireless communication systems implementing trigger-based joint transmit-receive (TX-RX) sensing for channel access.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication at a base station. The method may include sending a pre-grant transmission via a serving cell, the pre-grant transmission indicating that the serving cell intends to schedule a future communication with a first user equipment, wherein the pre-grant transmission is configured to trigger a reservation communication from a second user equipment having a communication interfered with by the pre-grant transmission, monitoring, via the serving cell, for receipt of a pre-grant acknowledgment communication from the first user equipment or the reservation communication in response to the pre-grant transmission, and determining, by the serving cell, whether to perform the future communication with the first user equipment based at least in part on the monitoring.

In an aspect, the disclosure provides a method of wireless communication at a first user equipment. The method may include monitoring, via receiver, for one or more transmissions from a first base station, detecting, during the monitoring, interference associated with a pre-grant communication, the pre-grant communication associated with a future communication between a second base station a second user equipment, and transmitting, via a transmitter, a reservation communication to the second base station in response to the pre-grant communication.

In an aspect, the disclosure provides a method of wireless communication at a user equipment. The method may include sending, by a receiver device on a channel, a first reservation communication to a transmitter device based on a first schedule defining a first period between reservation communication transmissions, wherein the first reservation communication is configured to cause the transmitter device to delay a first transmission opportunity period (TxOP), detecting, by the receiver device, interference from the transmitter device on the channel after the sending of the first reservation communication; determining, by the receiver device, based on the detecting, a second schedule defining a second period between reservation communication transmissions, wherein the second period is shorter than the first period, and sending, by the receiver device, a second reservation communication to the transmitter device based on the second schedule, wherein the second reservation communication causes the transmitter device to delay a second TxOP.

The disclosure also provides an apparatus (e.g., a base station or a user equipment (UE)) including a memory storing computer-executable instructions and at least one processor configured to execute the computer-executable instructions to perform at least one of the above methods, an apparatus including means for performing at least one of the above methods, and a non-transitory computer-readable medium storing computer-executable instructions for performing at least one of the above methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G/NR frame, in accordance with some aspects of the present disclosure.

FIG. 2B is a diagram illustrating an example of DL channels within a 5G/NR subframe, in accordance with some aspects of the present disclosure.

FIG. 2C is a diagram illustrating an example of a second 5G/NR frame, in accordance with some aspects of the present disclosure.

FIG. 2D is a diagram illustrating an example of UL channels within a 5G/NR subframe, in accordance with some aspects of the present disclosure.

DETAILED DESCRIPTION

Figure 1:
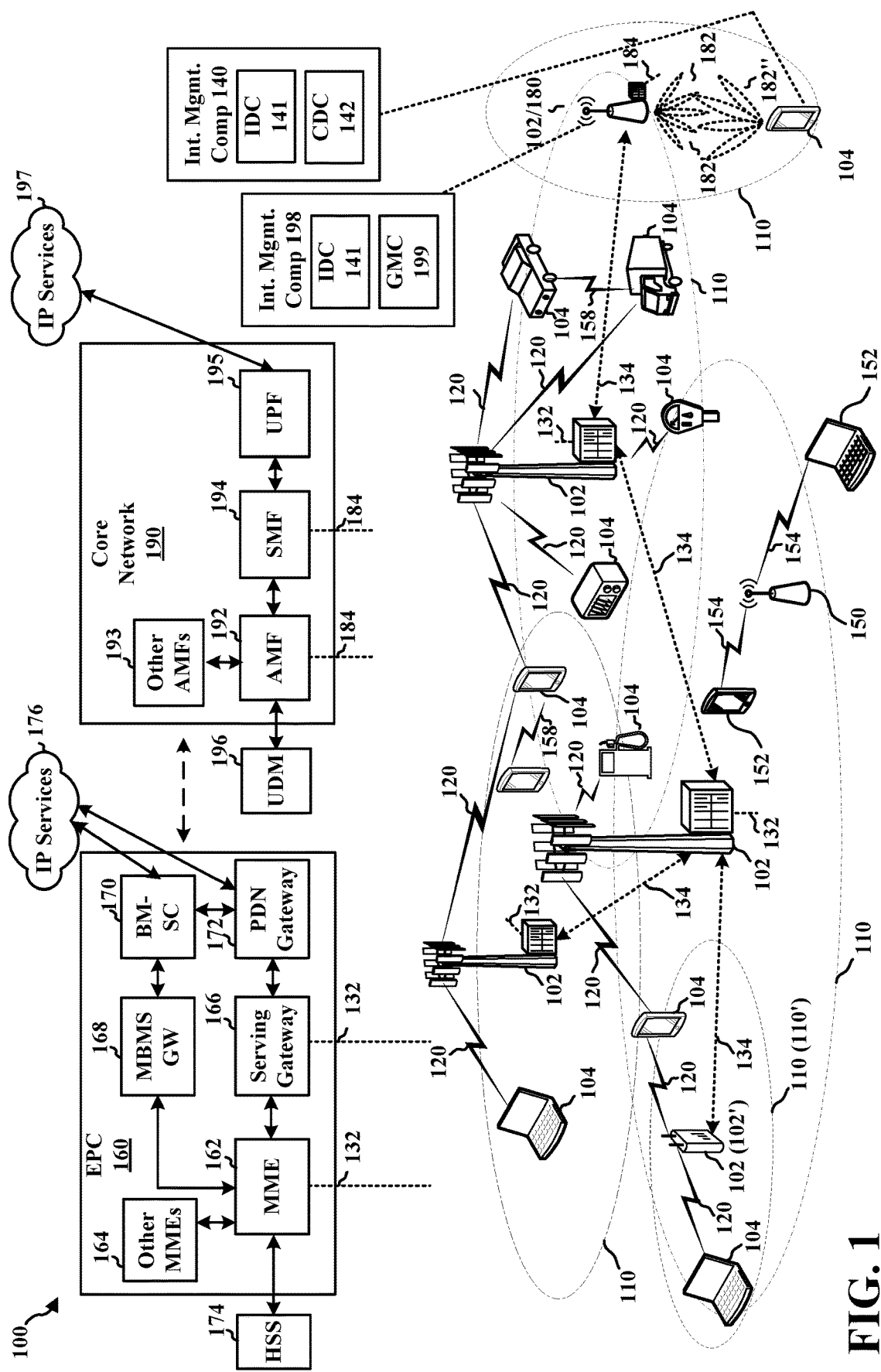
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In view of the expected increase in wireless data traffic demand, wireless system designers have turned to unlicensed spectrum bands to improve the capacity of future cellular systems. For example, NR may be operated in unlicensed bands through NR-based access to unlicensed spectrum (NR-U). Often communication operations in unlicensed spectrums utilize contention management techniques to provide fair access to wireless devices and co-existence amongst different radio access technologies. But contention management techniques often suffer from hidden node problems (i.e., when a node cannot hear an on-going transmission in the channel that would collide with a transmission by the node) and exposed node problems (i.e., when a node senses a channel as busy but could have transmitted simultaneously with the on-going transmission without causing a collision).

Moreover, inefficient contention management techniques result in long wait times for packet transmission opportunities, high latencies, and low throughputs. For example, many systems have adopted interference management approaches that rely on periodic reservation techniques and long contention windows. But periodic reservation techniques often lead to bursty interference among nodes, while long contention windows can cause inefficient transmission delays. Unfortunately, these problems are only exacerbated in NR-U due to the reliance on directional antennas and millimeter wave (mmWave), which further complicate interference management.

The present disclosure addresses one or more of the above issues by providing, in one aspect, a contention procedure where a receiver device having an ongoing reception is triggered to send a reservation communication, such as one or more reservation signals, in response to detecting interference with the ongoing reception by a pre-grant transmission of a neighbor base station or a pre-grant acknowledgement transmission of a neighbor transmitter device. In particular, the reservation communication may be sent to the neighbor base station to indicate the interference with reception, thereby causing the neighbor base stations to delay or cancel a subsequent downlink or uplink communication in order to avoiding further interference with the ongoing reception. By initiating the transmission of the reservation communication in response to detecting the interference, referred to herein as a triggered reservation signal, the present solution avoids unnecessary reservation signal transmissions, which may otherwise cause interference to other receivers.

In another aspect, the present disclosure provides a technique for the receiver device having the ongoing reception to ramp up, or increase a frequency of, the reservation communication transmissions from one transmit opportunity to the next based on interference detection in the prior transmit opportunity. In other words, when the one or more reservation signals previously transmitted within a given time window associated with a transmit opportunity do not result in a reduction or avoidance of subsequent interference with the ongoing reception, then the receiver device may transmit more reservation communications per unit time within a subsequent time window or transmit opportunity. Thus, the increase in frequency of reservation communications over time serves to increase the ability of the receiver device to silence subsequent interfering transmission, also referred to as jammers.

Thus, the present aspects may improve network communications by sending reservation communications based on being triggered by interference with an ongoing reception, thereby keeping the airways free of unnecessary transmissions.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium, which may be referred to as non-transitory computer-readable media. Non-transitory computer-readable media may exclude transitory signals. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells. In an aspect, a base station 102 may include an interference management component 198 that is configured to implement base station techniques for trigger-based joint transmit-receive (TX-RX) sensing for channel access. The interference management component 198 may include an interference detection component 141 configured to detect interference over a communication channel and manage channel assessment procedures, and a grant management component 199 configured to manage communication of, at least, pre-grant transmissions and uplink grant transmissions. Further, a UE 104 may include an interference management component 140 that is configured to implement UE techniques for trigger-based joint TX-RX sensing for channel access. The interference management component 140 may include an interference detection component 141 configured to detect interference over a communication channel and manage channel assessment procedures, and a collision prevention component 142 configured to manage communications, e.g., triggered reservation signals, sent in response to pre-grant transmissions received from a base station, or a pre-grant acknowledgement sent by a neighboring UE, in order to reduce or prevent subsequent interfering transmissions.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., SI interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHZ and 30 GHz, also referred to as centimeter wave. Communications using the mmW/near mmW radio frequency band (e.g., 3 GHZ-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies.

FIGS. 2A-2D illustrates example diagrams 200, 230, 250, and 280 illustrating examples structures that may be used for wireless communication by the base station 102 and the UE 104, e.g., for 5G NR communication. FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu * 15$ kHz, where u is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
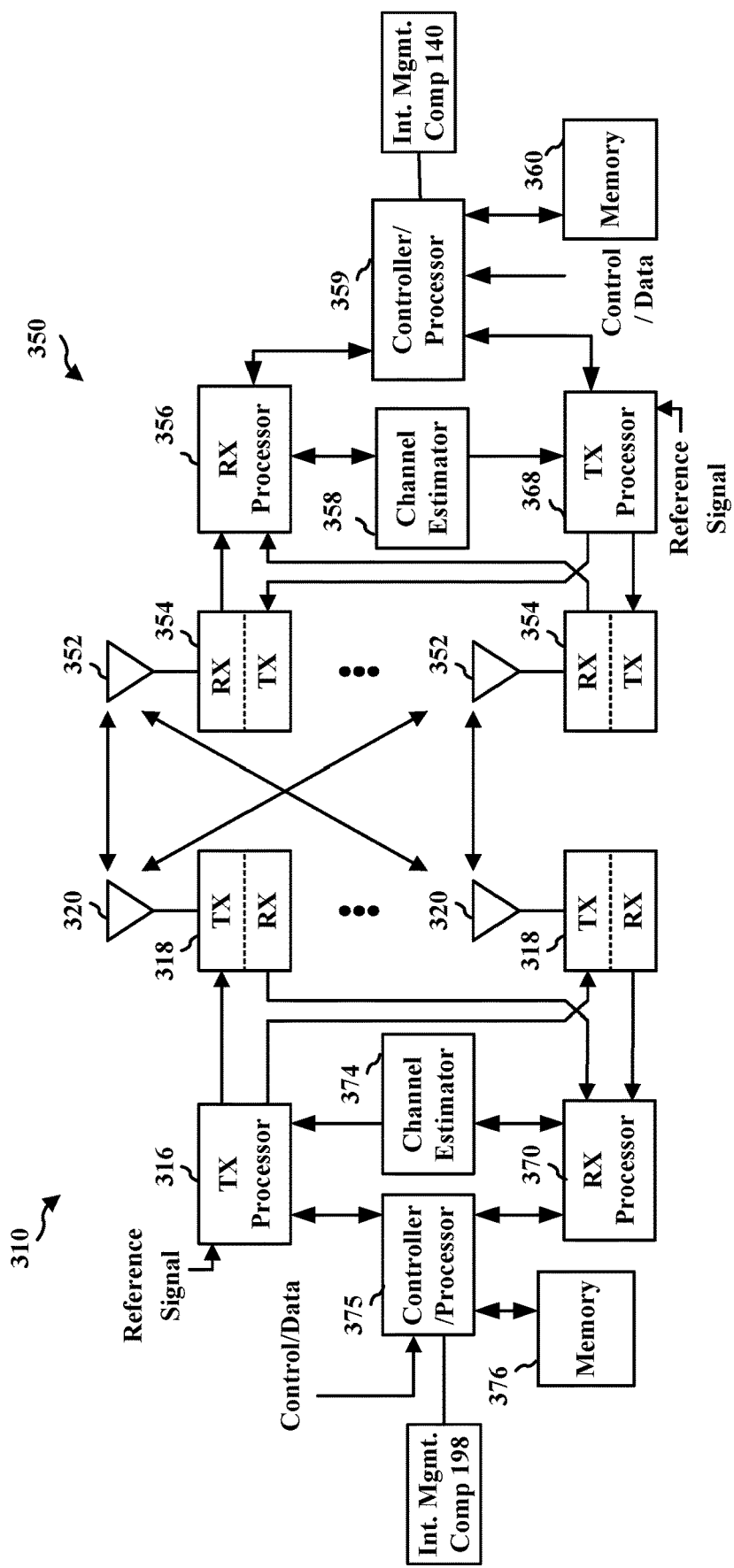
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356.

The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

With respect to the UE 350, at least one of the TX processor 368, the RX processor 356, and the controller/processor 359 may be configured to perform aspects in connection with the interference management component 140 of FIG. 1.

With respect to the base station 310, at least one of the TX processor 316, the RX processor 370, and the controller/processor 375 may be configured to perform aspects in connection with the interference management component 198 of FIG. 1.

As described herein, a UE may endeavor to receive one or more transmissions from a base station without interference from other wireless devices operating within a shared and/or unlicensed spectrum using technologies such as NR. As such, UEs and base stations may implement trigger-based joint TX-RX sensing for channel access, such as but not limited to mmWave channel access, to achieve rigorous protection for on-going transmissions and acceptable quality-of-service without causing long wait times for packet transmission opportunities, high latencies, and low throughputs, or requiring burdensome operations by wireless devices.

The present disclosure provides techniques for trigger-based joint TX-RX sensing for channel access. As used herein, a channel may refer to a communication resource that can be used for carrying information. For example, a UE can perform an interference management technique that involves a combination of receiver assisted channel access and transmit initiated triggering to communicate that they may have an on-going transmission disrupted by a future communication between a neighboring, non-serving base station and its served UE. For example, a first base station may send a pre-grant transmission indicating that the first base station intends to schedule a future communication with a first (e.g., served) UE, wherein the pre-grant transmission is configured to trigger a reservation communication from a second (e.g., non-served) UE having a communication interfered with by the pre-grant transmission. In other words, the second UE is served by a second base station. In some aspects, the future communication may be a downlink communication from the first base station to the first UE or an uplink communication from the first UE to the first base station. Further, in some aspects, the pre-grant transmission is configured to cause a spike in energy detectable by the first UE or the second UE. Alternatively, the pre-grant transmission may include a sequence that more definitively indicates the future communication, as compared to a spike in energy which could be caused for other reasons. Additionally, the first base station may monitor for receipt of a pre-grant acknowledgment communication from the first UE, or the reservation communication in response to the pre-grant transmission from the second UE, and determine whether to perform the future communication based at least in part on the monitoring. In some aspects, the monitoring may include performing a listen before talk (LBT) procedure for receipt of the reservation communication or determining the occurrence of a collision between the reservation communication and the pre-grant acknowledgment. Accordingly, the present aspects enable the first base station to be prevented from interfering in on-going receptions of non-served UEs, and enable UEs to more efficiently send reservation communications triggered by detecting interference. Further, in some aspects, the base station and UEs may not be hampered by longer distributed coordination function interframe spacing (DIFS) periods.

In addition, the present disclosure provides configured UE techniques for trigger-based joint TX-RX sensing for channel access, such as but not limited to mmWave channel access. For example, it may be desirable for a UE to mitigate the aforementioned problems by enabling the UE to communicate that it may have a reception communication disrupted by a future communication between a neighboring non-serving base station and its served UE in response to a pre-grant transmission. In some aspects, the future communication may be a downlink communication from the base station to the served UE, or an uplink communication from the served UE to the base station. For example, a first UE may monitor for one or more transmissions from a first base station that is serving the UE, and detect interference associated with a pre-grant transmission by a second, non-serving base station. The pre-grant transmission indicates that the second base station intends to schedule a future communication with a second UE being served by the second base station. Further, the first UE may transmit a reservation communication to the second base station in response to the pre-grant transmission. In some aspects, the reservation communication is configured to cause a spike in energy detectable by the second base station. Alternatively, the reservation communication may include a sequence including information identifying a collision on a particular channel. In addition, in some aspects, the first UE may tune away from the monitoring based on the interference and send the first base station a negative acknowledgment communication indicating a collision has been detected. Accordingly, the first UE is provided an opportunity to protect reception of the one or more transmissions without being burdened with periodically sending reservation communications.

Additionally, the present disclosure provides configured UE techniques for trigger-based joint TX-RX sensing for channel access, such as but not limited to mmWave channel access. For example, it may be desirable for a user equipment to mitigate the aforementioned problems by enabling the UE to prevent a reception communication from being disrupted by a future communication between two wireless entities operating on the same channel. A UE may send a first reservation communication to a transmitter device, e.g., a non-serving UE causing interference in a reception by the UE, based on a schedule defining a first period between reservation communication transmissions, wherein the first reservation communication is configured to cause the transmitter device to delay a first transmission opportunity period (TxOP). In some aspects, the UE may send the first reservation communication during a contiguous contention window at the transmitter device, wherein a duration of the contiguous contention window is less than a duration of the first period. Further, the UE may detect interference from the transmitter device on the channel after the sending of the first reservation communication, and update the schedule to define a second period that is shorter than the first period. Subsequently, the UE may send a second reservation communication to the transmitter device based on the updated schedule, wherein the second reservation communication causes the transmitter device to delay a second TxOP. Accordingly, the UE is provided an opportunity to protect reception of the one or more transmissions while not burdening devices with increasing backoff values and long contention windows.

Figure 4:
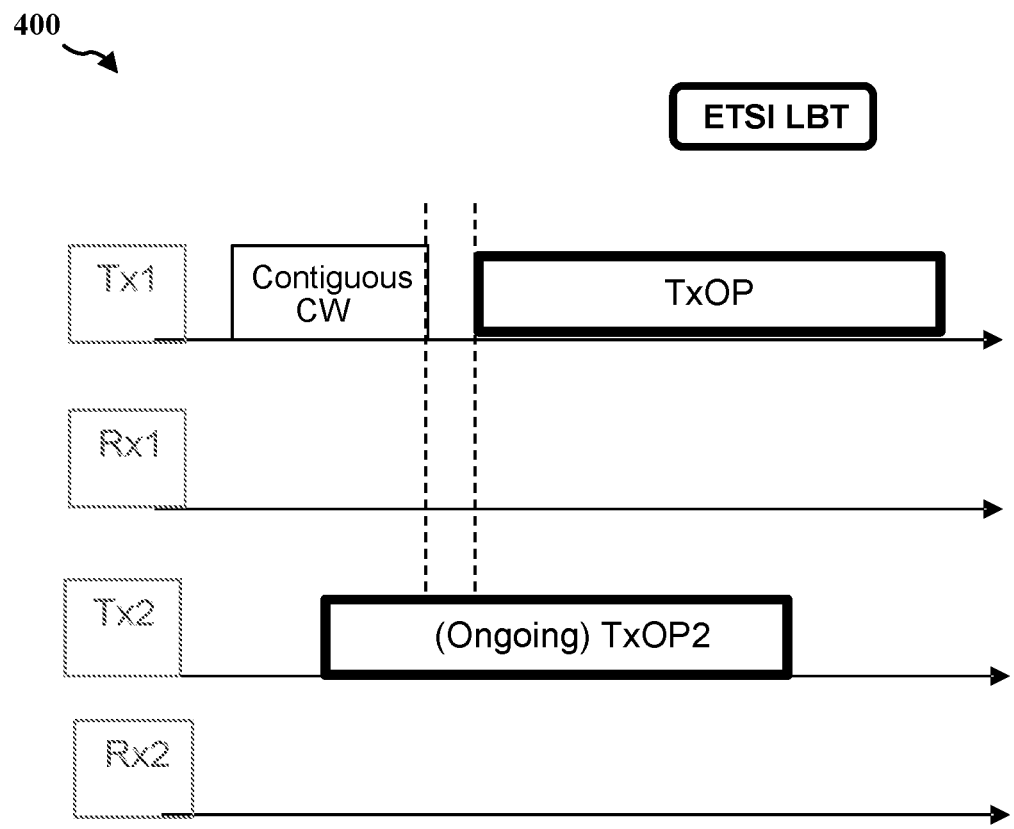
FIG. 4 is a diagram illustrating a first example contention management technique.
Figure 5:
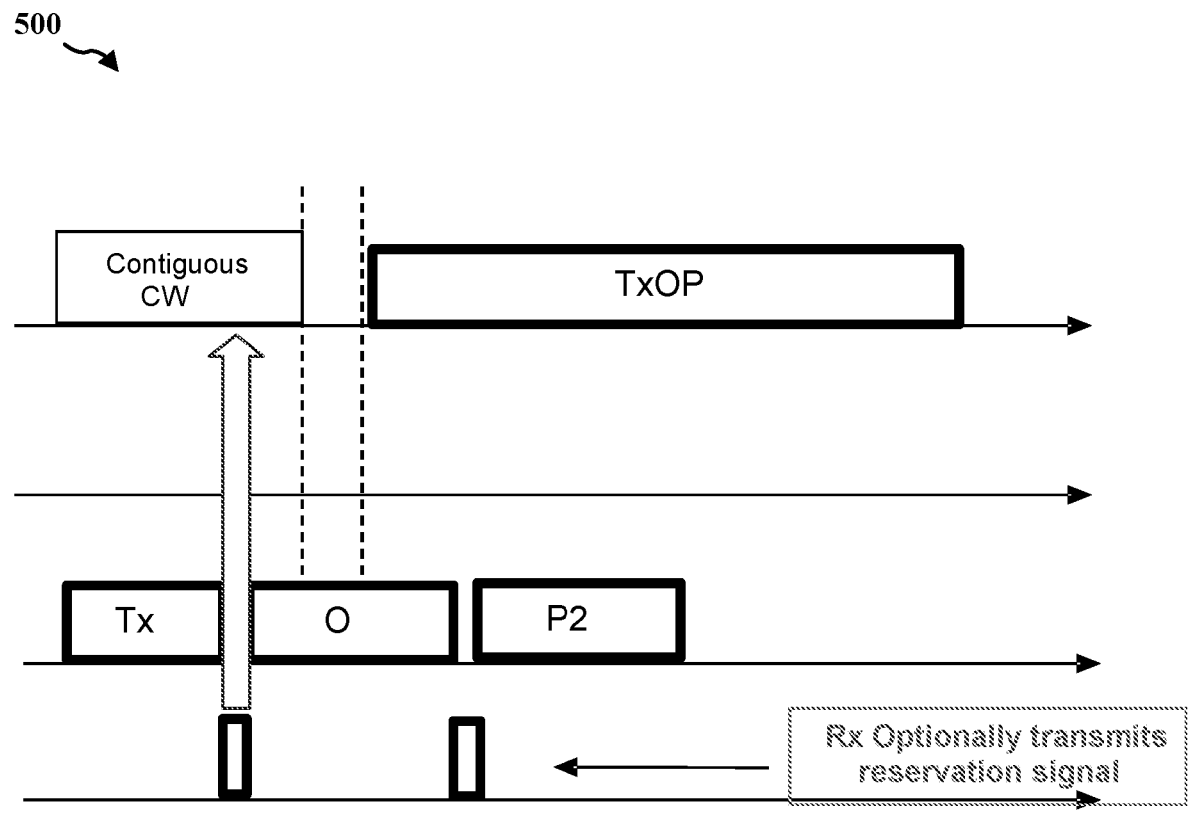
FIG. 5 is a diagram illustrating a second example contention management technique.
Figure 6:
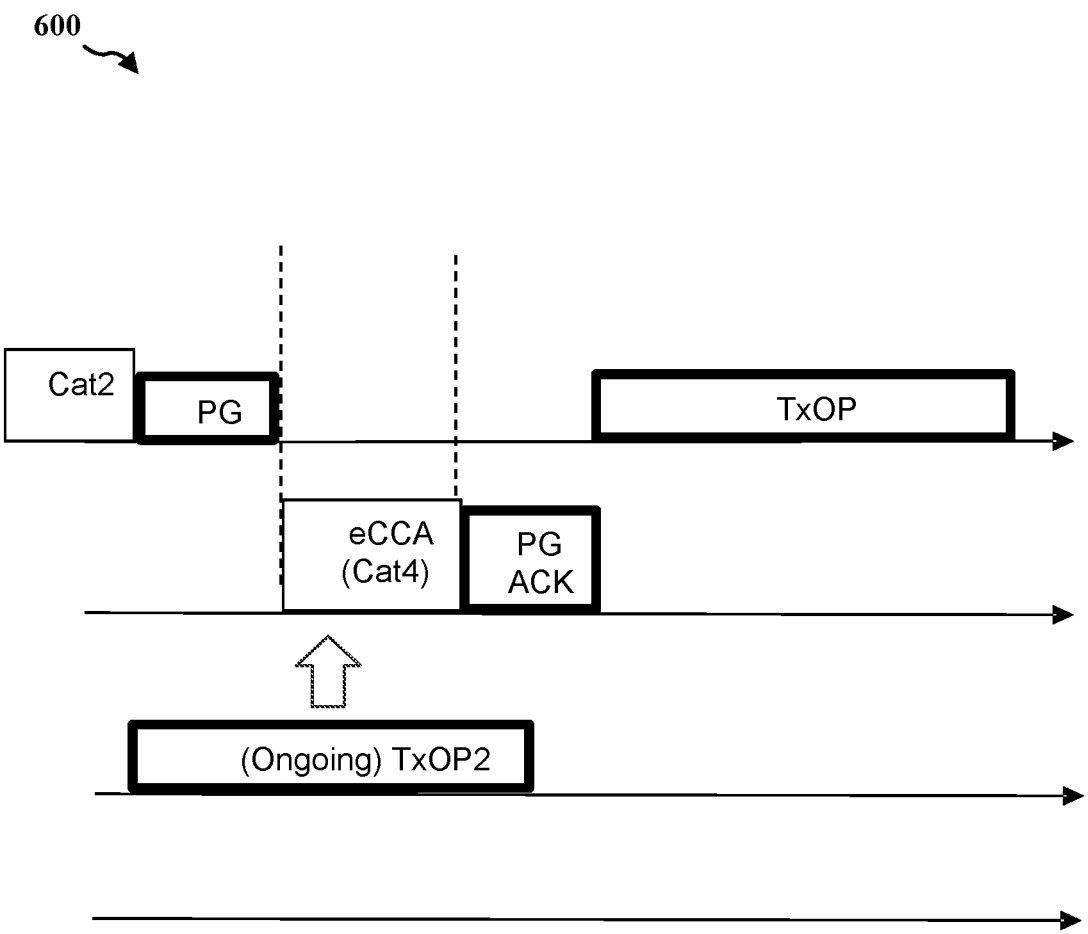
FIG. 6 is a diagram illustrating a third example contention management technique.

FIGS. 4-6 are example diagrams 400, 500, and 600 illustrating various contention management technique. Referring to FIGS. 4-6, the base stations 102 and the UEs 104 may perform one or more of the contention management techniques disclosed therein. The contention management techniques may be performed within a system including a first base station planning to schedule a future communication with a first UE, and a second base station sending downlink data to a second UE. In these figures, Tx1 and Rx1 correspond to transmission and reception communications at a first device, e.g., a base station, and Tx2 and Rx2 correspond to transmission and reception communications at a second device, e.g., a UE. As illustrated in FIG. 4, the Tx1, e.g., a first base station, may perform transmit energy sensing over a medium for a contiguous contention window prior to performing the future communication (i.e., TxOP). As illustrated in FIG. 5, the Tx1, e.g., a first base station, may perform receiver assisted transmit energy sensing over a medium for a contiguous contention window and receives assistance from the second (e.g., non-served) user equipment which periodically sends reservation communications configured to be received during the contiguous contention window. In some aspects, receipt of the reservation communication may modify the planned future communication. Conversely, if the first base station senses the medium is free, it may perform the future communication (i.e., TxOP). As illustrated in FIG. 6, the first base station may implement a category 2 LBT process followed by sending a pre-grant transmission to the first UE. If the channel is free over a fixed extend clear channel assessment (eCCA) period, the first UE may respond with a pre-grant acknowledgment communication which triggers the future communication. In some aspects, the techniques of FIGS. 4-6 may suffer from inefficient operation when applied to NR-U.

Figure 7:
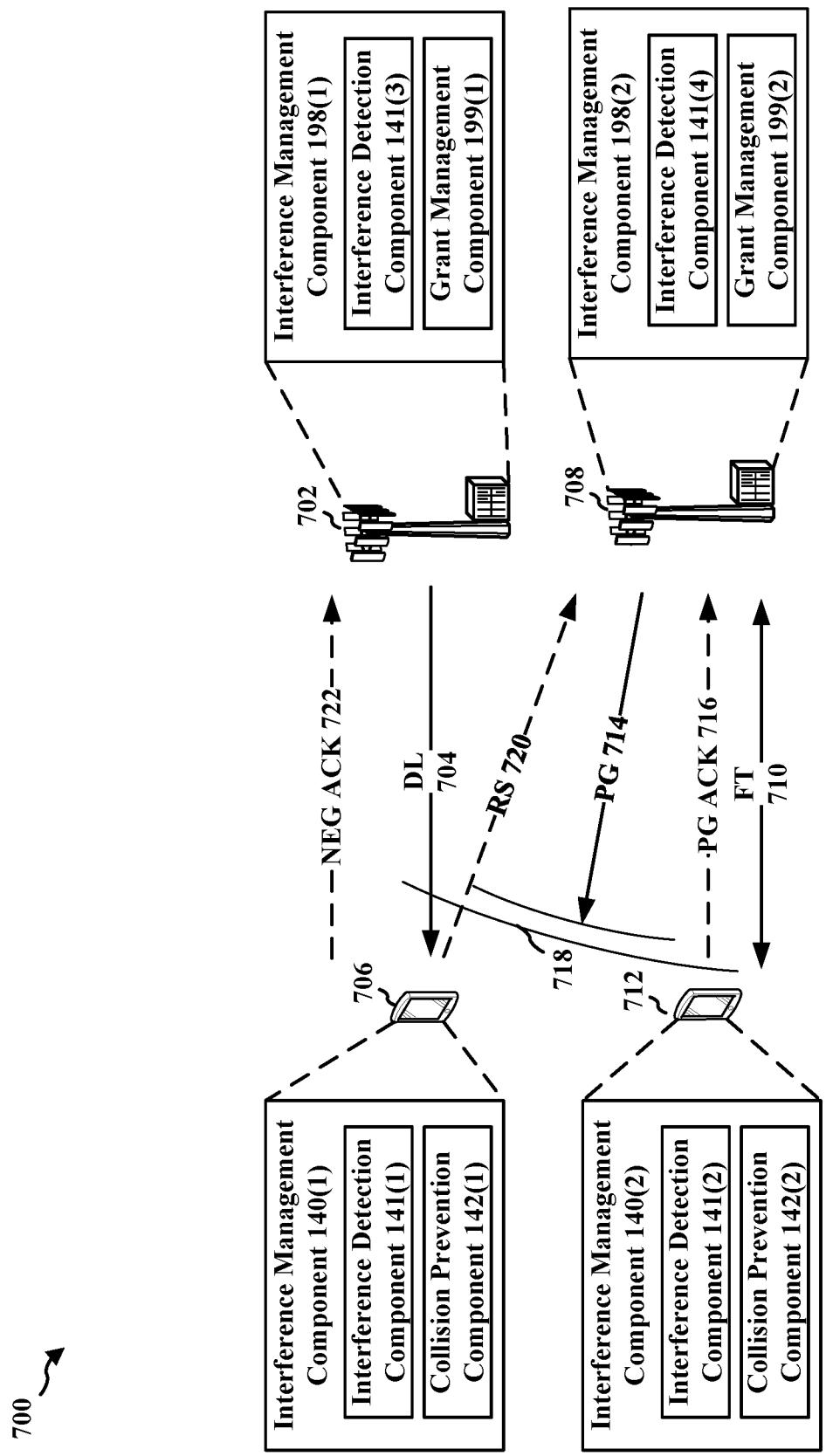
FIG. 7 is a diagram illustrating example communications and components of base stations and UEs.
Figure 8:
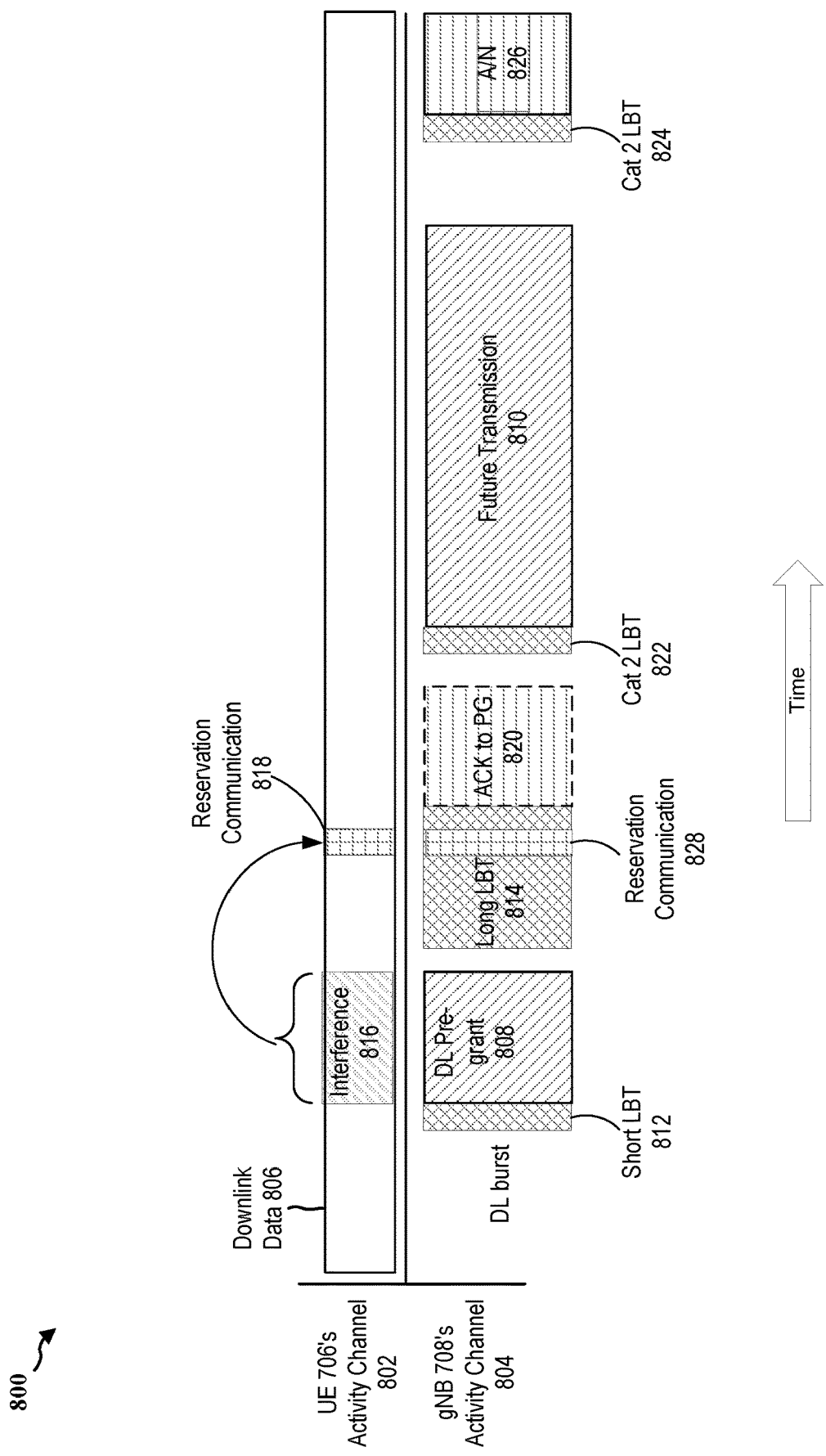
FIG. 8 is a block timing diagram illustrating first example communication activities at a base station and a UE.

Referring to FIGS. 7-9, in one non-limiting aspect, a system 700 is configured to provide trigger-based joint TX-RX sensing for channel access, such as mmWave channel access, according to some aspects. As illustrated in FIG. 7, the system 700 may include a UE 706 in an ongoing reception with a gNB 702 that is transmitting downlink data 704 to the UE 706, and a neighboring gNB 708 endeavoring to perform a future communication 710 with its served UE 712. It is noted that future communication 710 is illustrated in dashed line format to represent this transmission being optional, as this transmission may not occur based on the features described herein for avoiding interference. In some aspects, the gNB 702 and the gNB 708 may be examples of base stations 102, and the UE 706 and the UE 712 may be examples of a UE 104.

Further, due to the gNB 702, UE 706, gNB 708, and UE 712 sharing spectrum in a specific geographic location, communications between the gNB 702 and the UE 706 may interfere with communications between the gNB 708 and the UE 712, and vice versa. As such, the gNB 702, UE 706, gNB 708, and UE 712 may employ the interference management components 140(1)-(2) and interference management components 198(1)-(2) to minimize interference and provide efficient operation.

For example, as illustrated in FIG. 7, the interference management component 198(2) of the gNB 708 may send a pre-grant transmission 714 indicating that the gNB 708 intends to schedule the future communication 710 with the UE 712. The pre-grant transmission 714 may be configured to cause a spike in energy detectable by the UE 706 and the UE 712, or may include a sequence identifying resources associated with performing the future communication 710, or a sequence that more definitively identifies the transmission as a pre-grant transmission, e.g., as compared to an energy spike, which could have other causes. In some aspects, the future communication 710 may be a downlink communication, e.g., downlink data, from the gNB 708 to the UE 712 or an uplink communication, e.g., uplink data, from the UE 712 to the gNB 708.

Based upon receipt of the pre-grant transmission 714, the interference management component 140(2) of the UE 712 may send a pre-grant acknowledgment communication 716 to the gNB 708 acknowledging receipt of the pre-grant transmission 714. It is noted that the pre-grant acknowledgment communication 716 is illustrated in dashed line format, as this transmission may not occur if the UE 712 does not receive or does not respond to the pre-grant transmission 714.

Further, transmission of the pre-grant transmission 714 may cause interference 718 at the UE 706 in the ongoing reception with gNB 702. For example, the gNB 708 may not be aware of the ongoing communication between the UE 706 and the gNB 708, or that the transmission of the pre-grant transmission 714 is causing interference at the UE 706. In response to detecting the interference 718 associated with the pre-grant transmission 714, the interference management component 140(1) at the UE 706 may send the reservation communication 720 to the gNB 708. Additionally, or alternatively, transmission of the pre-grant acknowledgment communication 716 may cause interference 718. In response to the interference 718 associated with the pre-grant acknowledgment communication 716, the interference management component 140(1) at the UE 706 may send the reservation communication 720 to the gNB 708. The reservation communication 720 may be configured to cause a spike in energy detectable by the gNB 708 or include a sequence indicating an occurrence of a collision on the shared channel. In some aspects, interference management component 140(1) may cause the UE 706 to tune away from the spectrum shared with the gNB 708, and send the gNB 702 a negative acknowledgment communication 722 indicating that a collision, e.g., the interference 718, has been detected to indicate to the gNB 702 that the UE 706 is having difficulty receiving transmissions from the gNB 702.

Further, the gNB 708 may monitor for receipt of the pre-grant acknowledgment communication 716 from the UE 712 or the reservation communication 720. Additionally, the interference management component 140(4) may determine whether to proceed with the future communication 710 based at least in part on the monitoring. For example, the interface management component 140(4) may cancel or delay the future communication 710 in response to non-receipt of the pre-grant acknowledgment communication 716 or receipt of the reservation communication 720.

In some aspects, the gNB 708 or the UE 712 may perform a LBT process when monitoring for receipt of the reservation communication 720 or determining the occurrence of collision between the reservation communication 720 and the pre-grant acknowledgment communication 716. The LBT process may be performed to determine whether the shared spectrum is being used by another system. In some aspects, the LBT process may include performing a clear channel assessment (CCA) using energy detection prior to a transmission over an operating channel. The operating channel is considered occupied if the detected energy level over the operating channel exceeds the predefined level. In some aspects, if a wireless device (e.g., base station 102 or UE 104) determines that the channel is free, the wireless device can proceed to transmit for a period of time, which can be referred to as a Transmission Opportunity (TXOP). In some aspects, the TXOP may be less than a defined maximum TXOP (a maximum time duration). Conversely, if the wireless device determines that the channel is busy, the wireless devices does not transmit and executes a procedure to choose a random time (a backoff time) to attempt transmission again. A state of the wireless node in which the wireless node does not transmit for the backoff time is referred to as an extended CCA (eCCA) state. Further, in some aspects, the LBT process may include monitoring for reception of one or more signals having an energy level greater than a threshold during a contiguous window of a plurality of contention slots.

In some aspects, the LBT process may be one of the following: category 1 (Cat 1 LBT): immediate transmission after a short switching gap of fixed value, Category 2 (Cat 2 LBT): LBT without random back-off and fixed CCA period, Category 3 (Cat 3 LBT): LBT with random back-off with a contention window of fixed size, in which the extended CCA period is drawn by a random number within a fixed contention window, and Category 4 (Cat 4 LBT): LBT with random back-off with a contention window of variable size, in which the extended CCA period is drawn by a random number within a contention window.

FIG. 8 is a block timing diagram illustrating example communication activities at a base station, e.g., gNB 708, and UE 706 associated with a triggered reservation communication in a downlink scheduling scenario. The block timing diagram 800 includes channel activity 802 representing communication activity at the UE 706 and channel activity 804 representing communication activity at the gNB 708. Further, the channel activity 802 includes the channel activity item 806 representing the UE 706 receiving the downlink data 704 from the gNB 702. As discussed herein, the present disclosure discloses techniques for permitting efficient communications by implementing trigger-based joint TX-RX sensing for mmWave channel access.

The channel activity 804 includes channel activity item 808 representing the gNB 708 sending the pre-grant transmission 714 to the UE 712. Further, the pre-grant transmission 714 may signify that the gNB 708 intends to schedule a downlink operation (i.e., future communication 710 of downlink data) as represented by the channel activity item 810. In some aspects, the gNB 708 may perform a first LBT process, as represented by channel activity item 812, prior to sending the pre-grant acknowledgment communication 716. In addition, in response to sending the pre-grant transmission 714, the gNB 708 may perform a second LBT process as represented by channel activity item 814. In some examples, the second LBT process may be longer than the first LBT process. In some aspects, the pre-grant transmission 714 may also trigger an LBT process at the UE 712, e.g., an eCCA process.

Further, as discussed with respect to FIG. 7, the pre-grant transmission 714 may cause the interference 718 at the UE 706, as represented by channel activity item 816. In response to the interference 718, the UE 706 may send the reservation communication 720 as represented by the channel activity item 818 to the gNB 708.

In some aspects, the gNB 708 may receive the pre-grant acknowledgment communication 716 from the UE 712 as represented by the channel activity item 820. As described herein, when the gNB 708 receives the pre-grant acknowledgment communication 716 and the gNB 708 does not receive the reservation communication 720, the gNB 708 may proceed with the future communication 710. In some aspects, performing the future communication 710 may include at least one of a performing a third LBT process as represented by the channel activity item 822, sending the future communication 710 as represented by the channel activity item 810, performing a fourth LBT process as represented by the channel activity item 824, or sending an acknowledgment as represented by the channel activity item 826. In some aspects, the third LBT process and the fourth LBT process may be Cat 2 LBT. Conversely, the gNB 708 may cancel or delay performing the future communication 710 in response to non-receipt of the pre-grant acknowledgment communication 716, or receipt of the reservation communication 720 as represented by the channel activity item 828.

Figure 9A:
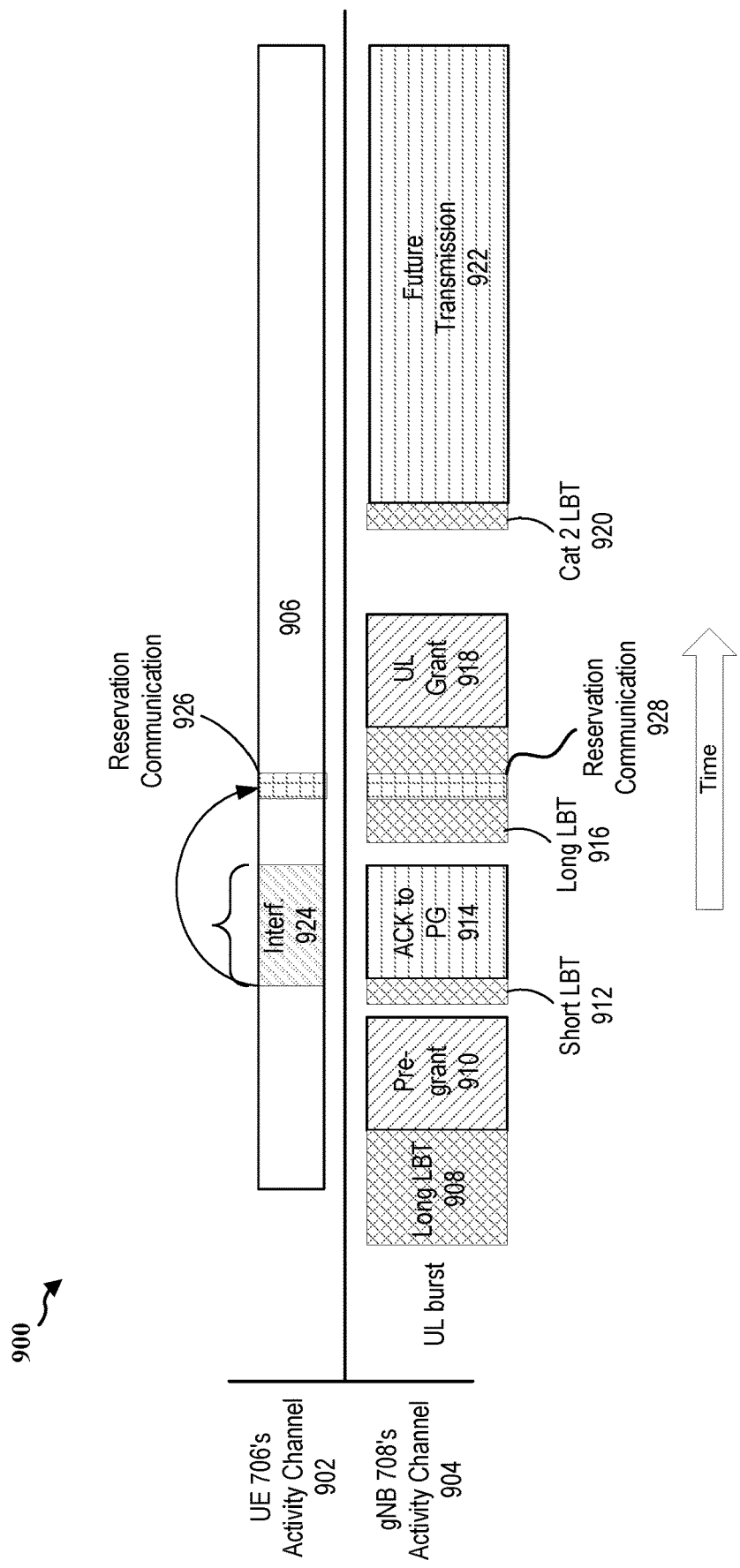
FIG. 9A is a block timing diagram illustrating second example communication activities at a base station and a UE.

FIG. 9A is a block timing diagram illustrating example communication activities at a base station, e.g., gNB 708, and UE 706 associated with a triggered reservation communication in a first uplink scheduling scenario, where the gNB 708 may initiate medium sensing with a relatively long LBT (e.g., a CCA of a contiguous number of slots) before sending a pre-grant transmission. The block timing diagram 900 includes channel activity 902 representing communication activity at the UE 706 and channel activity 904 representing communication activity at the gNB 708. Further, the channel activity 902 includes the channel activity item 906 representing the UE 706 receiving the downlink data 704 from the gNB 702.

In addition, the channel activity 904 includes channel activity item 908 representing the gNB 708 performing a first LBT process, and channel item 910 representing sending the pre-grant transmission 714 to the UE 712 after the first LBT process has been successfully performed. The pre-grant transmission 714 may signify that the gNB 708 intends to schedule an uplink operation (i.e., future communication 710) with the UE 712. In response to sending the pre-grant transmission 714, the gNB 708 may perform a second LBT process as represented by channel activity item 912.

The channel activity 904 may include the channel activity item 914 representing receipt of the pre-grant acknowledgment communication 716 from the UE 712. In response to the receipt of the pre-grant acknowledgment communication 716, the gNB 708 may perform a third LBT process represented as channel activity item 916. If the third LBT process is successful, the gNB 708 may send an uplink grant to the UE 712, as represented by channel activity item 918. Further, in response to sending the uplink grant, the gNB 708 may perform a fourth LBT process and send the future communication 710 (i.e., receiving uplink data from the UE 712) upon successful completion of the fourth LBT process, as represented by channel activity items 920 and 922. In some aspects, the fourth LBT process may be a Cat 2 LBT.

Further, as discussed with respect to FIG. 7, the pre-grant acknowledgment communication 716 may cause the interference 718 at the UE 706, as represented by channel activity item 924. In response to the interference 718, the UE 706 may send the reservation communication 720 to the gNB 708 as represented by the channel activity item 926. As described herein, the gNB 708 may cancel or delay the future communication 710 of uplink data from the UE 712 to the gNB 708 in response to receipt of the reservation communication 720 as represented by the channel activity item 928.

Figure 9B:
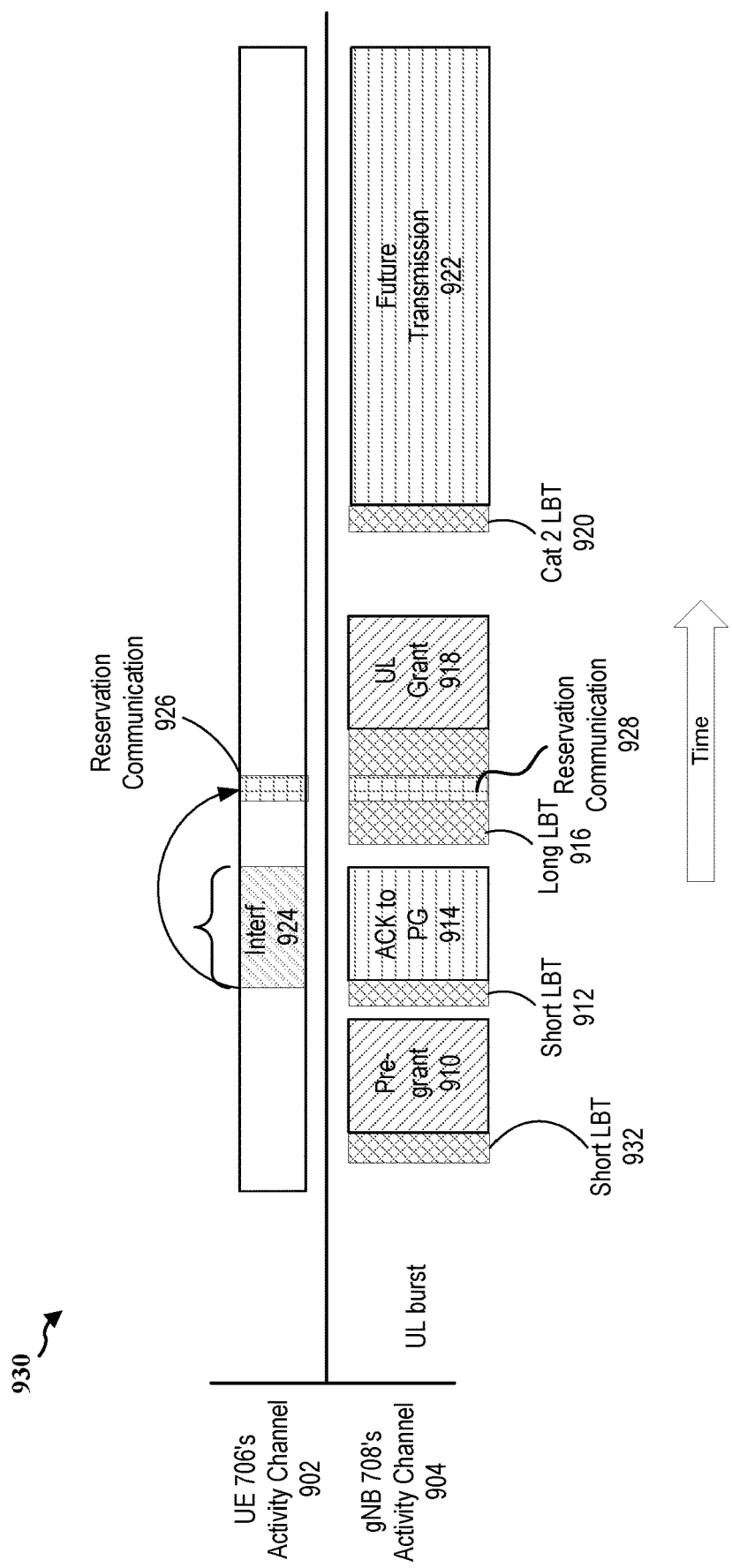
FIG. 9B is a block timing diagram illustrating third example communication activities at a base station and a UE.

FIG. 9B is a block timing diagram illustrating example communication activities at a base station, e.g., gNB 708, and UE 706 associated with a triggered reservation communication in a second uplink scheduling scenario, where the gNB 708 may initiate medium sensing with a relatively short LBT before sending a pre-grant transmission. In other words, FIG. 9A illustrates performing a long LBT prior to sending the pre-grant transmission 714. Alternatively, as illustrated in FIG. 9B, The block timing diagram 930 illustrates that sending the pre-grant transmission 714 may be preceded by a shorter LBT process as represented by channel activity item 932, instead of the longer LBT process as represented by channel activity item 908 in FIG. 9A.

Figure 10:
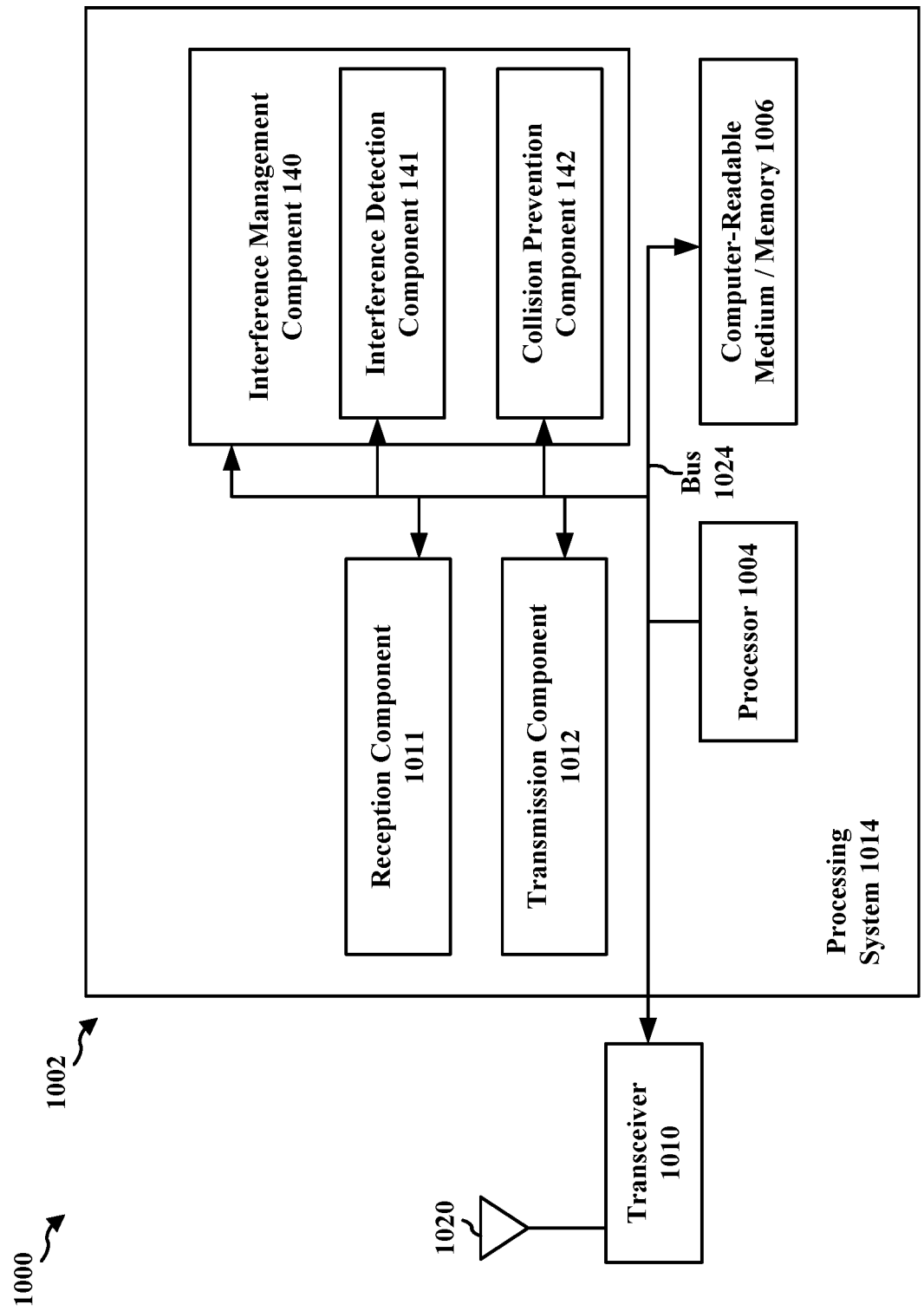
FIG. 10 is a diagram illustrating an example of a hardware implementation for a UE apparatus employing a processing system.

FIG. 10 is a diagram 1000 illustrating an example of a hardware implementation for a UE 1002 employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware components, represented by the processor 1004, the components 140, 141, and 142, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled with a transceiver 1010. The transceiver 1010 is coupled with one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the reception component 1011. The reception component 1011 may receive the downlink data 704, the pre-grant transmission 714, the pre-grant acknowledgment communication 716, the reservation communication, and the future communication 710. In addition, the transceiver 1010 receives information from the processing system 1014, specifically the transmission component 1012, and based on the received information, generates a signal to be applied to the one or more antennas 1020. Further, the transmission component may transmit the future communication 710, the pre-grant acknowledgment communication 716, the reservation communication 720, and the negative acknowledgment communication 722.

The processing system 1014 includes a processor 1004 coupled with a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system 1014 further includes at least one of the components 140, 141, and 142. The components may be software components running in the processor 1004, resident/stored in the computer readable medium/memory 1006, one or more hardware components coupled with the processor 1004, or some combination thereof. The processing system 1014 may be a component of the UE 350 and may include the memory 360 and/or at least one of the TX processor 368, the RX processor 356, and the controller/processor 359. Alternatively, the processing system 1014 may be the entire UE (e.g., see 350 of FIG. 3).

In one configuration, the UE 1002 for wireless communication includes means for monitoring, via receiver, for one or more transmissions from a first base station; detecting, during the monitoring, interference associated with a pre-grant communication, the pre-grant communication associated with a future transmission between a second base station a second user equipment; and transmitting, via a transmitter, a reservation communication to the second base station in response to the pre-grant communication. The aforementioned means may be one or more of the aforementioned components of the UE 1002 and/or the processing system 1014 of the UE 1002 configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The interference detection component 141 may be configured to detect interference over the reception component 1011. For instance, the interference detection component 141 may be configured to detect a spike in energy or a sequence including information identifying resources associated with a future transmission. Further, the interference detection component 141 may manage channel assessment procedures, e.g., LBT processes and eCCA. In addition, the interference detection component 141 may inform the collision prevention component 142 of detected interference and failed LBT processes.

The collision prevention component 142 configured manage communications sent in response to pre-grant transmissions received from a base station. For example, the collision prevention component 142 may be configured to send pre-grant acknowledgment communications, and reservation communications 720, and negative acknowledgment communications 722. In some aspects, the collision prevention component 142 may be configured to send pre-grant acknowledgment communications, and reservation communications 720, and negative acknowledgment communications 722 in response to the interference detection component 141 detecting an interference over the reception component 1011.

Figure 11:
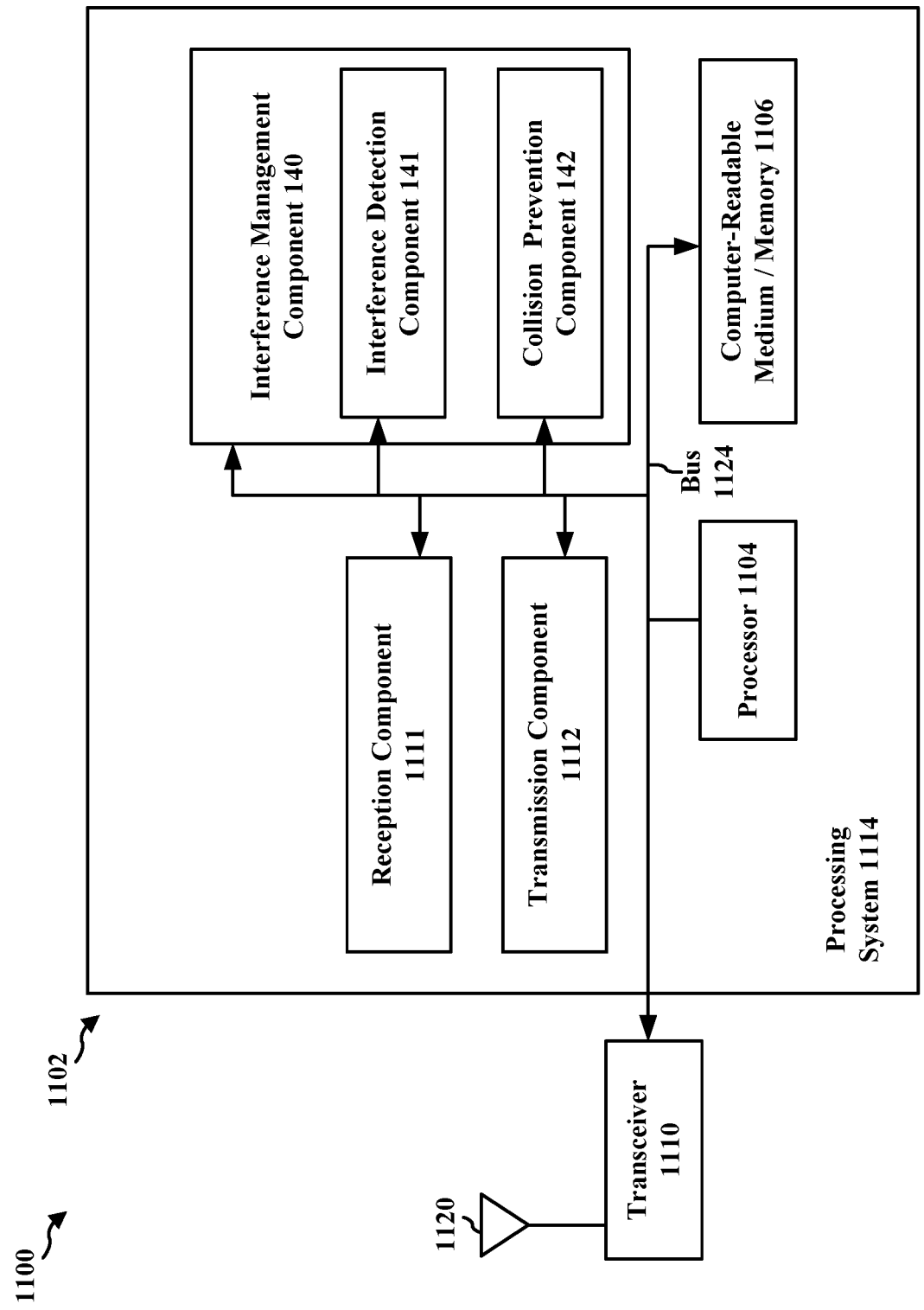
FIG. 11 is a diagram illustrating an example of a hardware implementation for a base station employing a processing system.

FIG. 11 is a diagram 1100 illustrating an example of a hardware implementation for a base station 1102 employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 198, 141, and 199, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled with a transceiver 1110. The transceiver 1110 is coupled with one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1111. The reception component 1011 may receive the future communication 710, the pre-grant acknowledgment communication 716, the reservation communication 720, and the negative acknowledgment communication 722. In addition, the transceiver 1110 receives information from the processing system 1114, specifically the transmission component 1112, and based on the received information, generates a signal to be applied to the one or more antennas 1120. Further, the transmission component may send the downlink data 704, the pre-grant transmission 714, the future communication 710, or the uplink grant.

The processing system 1114 includes a processor 1104 coupled with a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 198, 141, and 199. The components may be software components running in the processor 1104, resident/stored in the computer readable medium/memory 1106, one or more hardware components coupled with the processor 1104, or some combination thereof. The processing system 1114 may be a component of the base station 310 and may include the memory 376 and/or at least one of the TX processor 316, the RX processor 370, and the controller/processor 375. Alternatively, the processing system 1114 may be the entire base station (e.g., see 310 of FIG. 3).

In one configuration, the base station 1102 for wireless communication includes means for sending a pre-grant transmission via a serving cell, the pre-grant transmission indicating that the serving cell intends to schedule a future transmission with a first user equipment, wherein the pre-grant transmission is configured to trigger a reservation communication from a second user equipment having a communication interfered with by the pre-grant transmission; monitoring, via the serving cell, for receipt of a pre-grant acknowledgment communication from the first user equipment or the reservation communication in response to the pre-grant transmission; and determining, by the serving cell, whether to perform the future transmission with the first user equipment based at least in part on the monitoring. The aforementioned means may be one or more of the aforementioned components of the base station 1102 and/or the processing system 1114 of the base station 1102 configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The interference detection component 141 may be configured to detect interference over the reception component 1111. For instance, the interference detection component 141 may be configured to detect a spike in energy, a sequence including information identifying resources associated with a future transmission, or a sequence identifying information identifying a collision. Further, the interference detection component 141 may manage channel assessment procedures, e.g., LBT processes and eCCA. In addition, the interference detection component 141 may inform the collision prevention component 142 of detected interference and failed LBT processes.

The grant management component 199 may be configured to manage pre-grant and grant communications sent by the base station 1102. For example, the grant management component 199 may be configured to send the pre-grant transmission 714 and up-link grant as presented by channel activity item 918. In some aspects, the collision prevention component 142 may be configured to send the pre-grant transmission 714 and the up-link grant in response to the interference detection component 141 failing to detect an interference over the reception component 1111 or successful completion of an LBT process.

Figure 12:
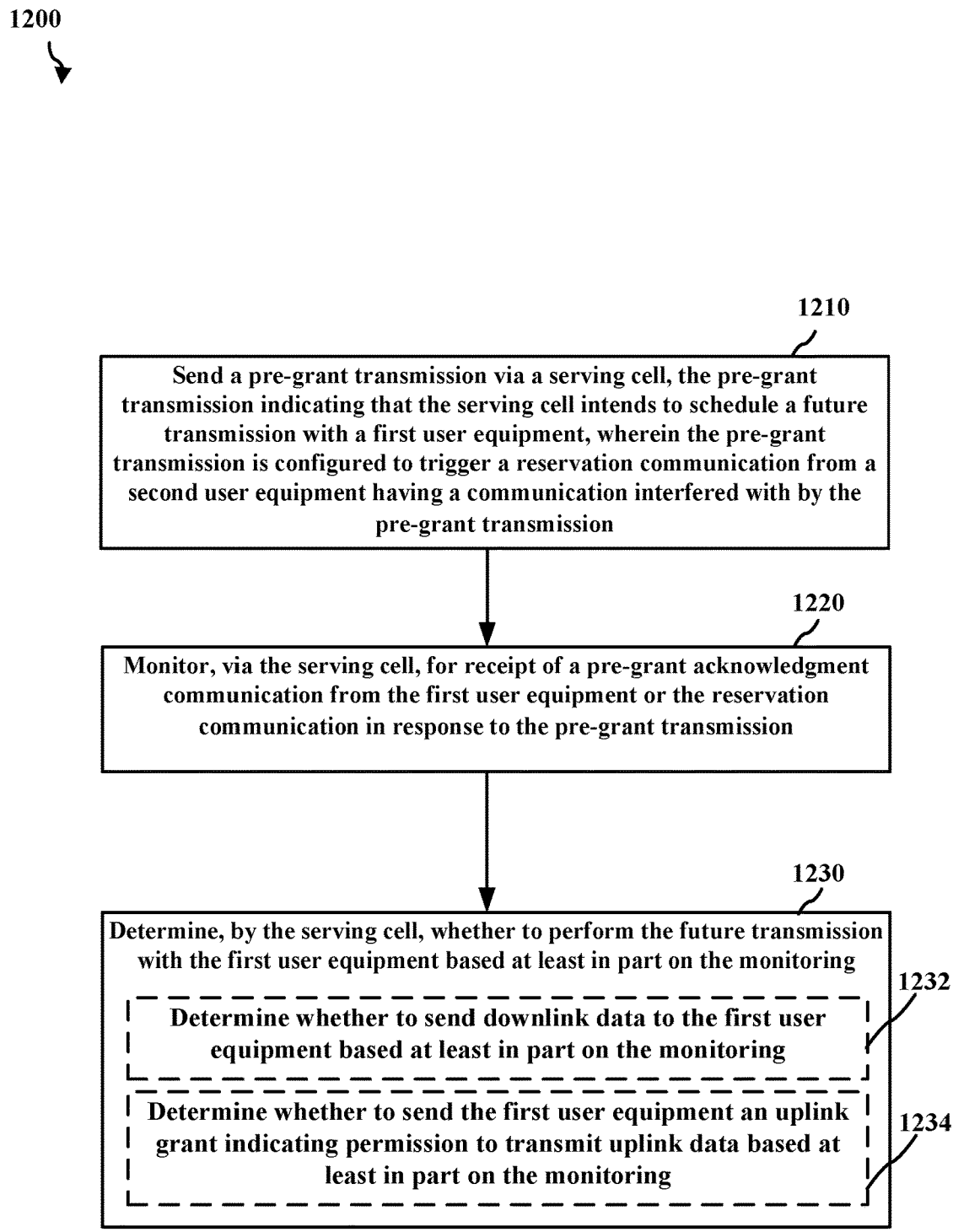
FIG. 12 is a flowchart of a first method of wireless communication.

FIG. 12 is a flowchart of a method 1200 of trigger-based joint TX-RX sensing for mmWave channel access. The method may be performed by a base station (e.g., the base station 102, which may include the memory 360 and which may be the entire base station or a component of the base station, such as interference management component 198, the TX processor 368, the RX processor 356, and/or the controller/processor 359; the base station 702; the base station 708; the base station 1102).

At block 1210, the method 1200 may include sending a pre-grant transmission via a serving cell, the pre-grant transmission indicating that the serving cell intends to schedule a future transmission with a first user equipment, wherein the pre-grant transmission is configured to trigger a reservation communication from a second user equipment having a communication interfered with by the pre-grant transmission. For example, the grant management component 199(2) of the gNB 708 may send the pre-grant transmission 714 indicating that the gNB 708 intends to schedule the future communication 710 with the UE 712.

In some aspects, the pre-grant transmission may be configured to cause a spike in energy detectable by first user equipment or the user equipment, or include a sequence identifying information regarding the performance of future transmission with the second user equipment. For example, the pre-grant transmission 714 may be configured to cause a spike in energy detectable by the UE 706 and the UE 712, or include a sequence including information regarding performance of the future communication 710 with the UE 712.

Further, in some aspects, the future transmission may be an uplink operation or a downlink operation. For example, the future communication 710 may be a downlink communication from the gNB 708 to the UE 712 or an uplink communication from the UE 712 to the gNB 708.

In some aspects, the method may include performing a LBT process prior to sending the pre-grant transmission. For example, the gNB 708 may perform one of the types of LBT processes represented by the channel activity items 812, 814, 908, 932, etc.

Accordingly, the base station 102, the base station 702, the base station 708, the base station 1102, the TX processor 316, the RX processor 370, and/or the controller/processor 375 executing the grant management component 199 may provide means for sending a pre-grant transmission via a serving cell, the pre-grant transmission indicating that the serving cell intends to schedule a future transmission with a first user equipment, wherein the pre-grant transmission is configured to trigger a reservation communication from a second user equipment having a communication interfered with by the pre-grant transmission.

At block 1220, the method 1200 may include monitoring, via the serving cell, for receipt of a pre-grant acknowledgment communication from the first user equipment or the reservation communication in response to the pre-grant transmission. For example, the interference detection component 141(4) of the gNB 708 may monitor the reception component 1111 of the gNB 708 for receipt of the pre-grant acknowledgment communication 716 or the reservation communication 720.

In some aspects, the method may include monitoring for reception of one or more signals having an energy level greater than a threshold during a contiguous window of a plurality of contention slots. For example, the interference detection component 141(4) may monitor for a reservation communication 720 causing a spike at the reception component 1111 during a contiguous window of a plurality of contention slots. In some other aspects, the monitoring may include monitoring for reception of a sequence indicating an occurrence of a collision on the channel at the first user equipment. For example, the interference detection component 141(4) may monitor for a reservation communication 720 identifying the interference 718.

In some aspects, the monitoring may include periodically receiving the reservation communication over a period of time associated with a LBT procedure. For example, the interference detection component 141(4) may perform an eCCA and periodically receive the reservation communication 720 from the UE 706 during a contiguous window of a plurality of contention slots. In some other aspects, the monitoring may include continuously receiving the reservation communication within the period of time associated with the LBT process. For example, the interference detection component 141(4) may perform an eCCA and continuously receive the reservation communication 720 from the UE 706 during contiguous window of a plurality of contention slots. In yet still some other aspects, the monitoring may include receiving a plurality of reservation communications within the period of time associated with the LBT process. For example, the interference detection component 141(4) may perform an eCCA and receive a predetermined amount of reservation communications 720 from the UE 706.

In some aspects, the monitoring may include periodically receiving the reservation communication over a period of time overlapping with receiving the pre-grant acknowledgment communication. For example, the interference detection component 141(4) may periodically receive the reservation communication 720 from the UE 706 over a period of time overlapping with receiving the pre-grant acknowledgment communication 716. In some other aspects, the monitoring may include continuously receiving the reservation communication within the period of time overlapping with receiving the pre-grant acknowledgment communication. For example, the interference detection component 141(4) may continuously receive the reservation communication 720 from the UE 706 over a period of time overlapping with receiving the pre-grant acknowledgment communication 716. In yet still some other aspects, the monitoring may include receiving a plurality of reservation communications within the period of time overlapping with receiving the pre-grant acknowledgment communication. For example, the interference detection component 141(4) may receive a predetermined amount of reservation communications 720 from the UE 706 within the period of time overlapping with receiving the pre-grant acknowledgment communication 716.

Accordingly, the base station 102, the base station 702, the base station 708, the base station 1102, the TX processor 316, the RX processor 370, and/or the controller/processor 375 executing the interference detection component 141 may provide means for monitoring, via the serving cell, for receipt of a pre-grant acknowledgment communication from the first user equipment or the reservation communication in response to the pre-grant transmission.

At block 1230, the method 1200 may include determining, by the serving cell, whether to perform the future transmission with the first user equipment based at least in part on the monitoring. For example, the gNB 708 may determine whether to perform the future communication 710 based upon whether the detection interference component 141(4) detects interference At sub-block 1232, the block 1230 may optionally include determining whether to send downlink data to the first user equipment based at least in part on the monitoring. For example, in some aspects, if the interference detection component 141(4) identifies receipt of the pre-grant acknowledgment communication 716 and non-receipt of the reservation communication 720, the gNB 708 may send the future communication 710 to the UE 712. As another example, in some aspects, if the interference detection component 141(4) identifies receipt of the reservation communication 720 or a collision between the reservation communication 720 and the pre-grant acknowledgment communication 716, the gNB 708 may cancel or delay sending the future communication 710.

At sub-block 1234, the block 1230 may optionally include determining whether to send the first user equipment an uplink grant indicating permission to transmit uplink data based at least in part on the monitoring. For example, if the interference detection component 141(4) identifies receipt of the reservation communication 720, the grant management component 199(2) may delay or cancel transmission of the uplink grant including resource information for performing the future communication 710. As yet still another example, if the interference detection component 141(4) identifies non-receipt of the reservation communication 720 and receipt of the pre-grant acknowledgment communication 716, the grant management component 199 may send the UE 712 an up link grant as represented by channel activity item 918. Further, the uplink grant may be used to facilitate the UE 712 sending the future communication 710 to the gNB 708.

Accordingly, the base station 102, the base station 702, the base station 708, the base station 1102, the TX processor 316, the RX processor 370, and/or the controller/processor 375 may provide means for determining, by the serving cell, whether to perform the future transmission with the first user equipment based at least in part on the monitoring.

Figure 13:
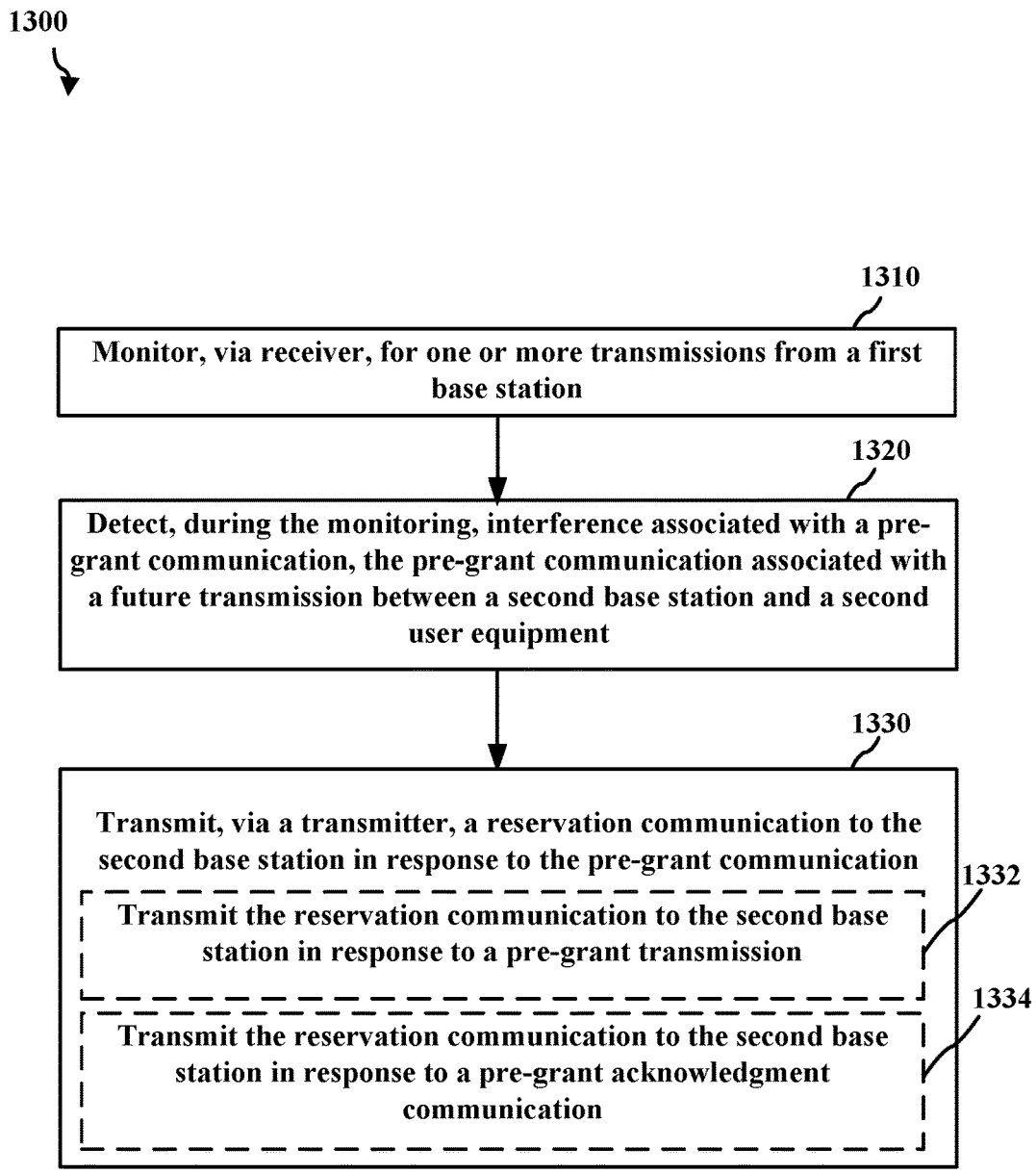
FIG. 13 is a flowchart of a second method of wireless communication.

FIG. 13 is a flowchart of a method 1300 of trigger-based joint TX-RX sensing for mmWave channel access. The method may be performed by a UE (e.g., the UE 104, which may include the memory 360 and which may be the entire UE 104 or a component of the UE 104, such as interference management component 140, the TX processor 368, the RX processor 356, and/or the controller/processor 359; the UE 706; the UE 712; the UE 1002).

At block 1310, the method 1300 includes monitoring, via receiver, for one or more transmissions from a first base station. For example, the UE 706 may monitor the reception component 1011 for receipt of the downlink data 704 from the gNB 702.

Accordingly, the UE 104, the UE 706, the UE 712, the UE 1002, the TX processor 368, the RX processor 356, and/or the controller/processor 359 may provide means for monitoring, via receiver, for one or more transmissions from a first base station.

At block 1320, the method 1300 includes detecting, during the monitoring, interference associated with a pre-grant communication, the pre-grant communication associated with a future transmission between a second base station and a second user equipment. For example, the interference detection component 141(1) may monitor the reception component 1011 for interference caused by the pre-grant transmission 714 or the pre-grant acknowledgment communication 716.

In some aspect, the method may include detecting a spike in energy on a medium. For example, the interference detection component 141(1) may detect a spike in energy at the reception component 1011. In some other aspects, the method may include identifying a sequence identifying information regarding the future transmission with another user equipment. For example, the interference detection component 141(1) may detect that the pre-grant transmission 714 includes a sequence identifying one or more resources associated with the performance of the future communication 710.

Accordingly, the UE 104, the UE 706, the UE 712, the UE 1002, the TX processor 368, the RX processor 356, and/or the controller/processor 359 executing the interference detection component 141 may provide means for detecting, during the monitoring, interference associated with a pre-grant communication, the pre-grant communication associated with a future transmission between a second base station and a second user equipment.

At block 1330, the method 1300 includes transmitting, via a transmitter, a reservation communication to the second base station in response to the pre-grant communication. For example, the collision prevention component 142 may send the reservation communication 720 to the gNB 708. In some aspects, the reservation communication 720 may include a sequence indicating an occurrence of a collision on the channel at the UE 706. In some other aspects, the reservation communication 720 may be configured to cause a spike in energy detectable by the second base station.

At sub-block 1332, the block 1330 may optionally include transmitting the reservation communication to the second base station in response to a pre-grant transmission. For example, the collision prevention component 142 may send the reservation communication 720 to the gNB 708 in response to the interference detection component 141 detecting the pre-grant transmission 714 corresponding to a downlink operation between the gNB 708 and the UE 712.

At sub-block 1334, the block 1330 may optionally include transmitting the reservation communication to the second base station in response to a pre-grant acknowledgment communication. For example, the collision prevention component 142 may send the reservation communication 720 to the gNB 708 in response to the interference detection component 141 detecting the pre-grant acknowledgment communication 716 corresponding to an uplink operation between the gNB 708 and the UE 712.

In some aspects, the method may include periodically sending the reservation communication over a period of time, continuously sending the reservation communication within the period of time, or sending a plurality of reservation communications within the period of time. For example, the collision prevention component 142 may periodically send the reservation communication 720 over a period of time, continuously send the reservation communication 720 over a period of time, or send a predetermined amount of reservation communications 720 over a period of time. Further, in some aspects, the period of time may correspond to a contention window (e.g., a contiguous contention window of an LBT process).

In addition, in some aspects, the method may include tuning away from the monitoring based on the interference, and sending, to the first base station, a negative acknowledgment communication indicating a collision has been detected. For example, the collision prevention component 142(1) may cause the UE 706 to tune away from the spectrum shared with the gNB 708, and send the gNB 702 a negative acknowledgment communication 722 indicating a collision has been detected. In some other aspects, the first base station may be configured to detect the reservation communication 720 from the UE 706. For instance, the gNB 702 may allocate a set of resources periodically across a plurality of slots to receive the reservation communication 720 from the UE 706.

Further, in some aspects, the reservation communication 720 may cause the gNB 708 to cancel or delay the future communication 710. As such, the UE 706 may receive the downlink data 704 from the gNB 702, without interference from the gNB 708, during a time slot corresponding to when the gNB 708 scheduled the future communication 710 associated with the pre-grant transmission 714.

Accordingly, the UE 104, the UE 706, the UE 712, the UE 1002, the TX processor 368, the RX processor 356, and/or the controller/processor 359 executing the collision prevention component 142 may provide means for transmitting, via a transmitter, a reservation communication to the second base station in response to the pre-grant communication.

Figure 14:
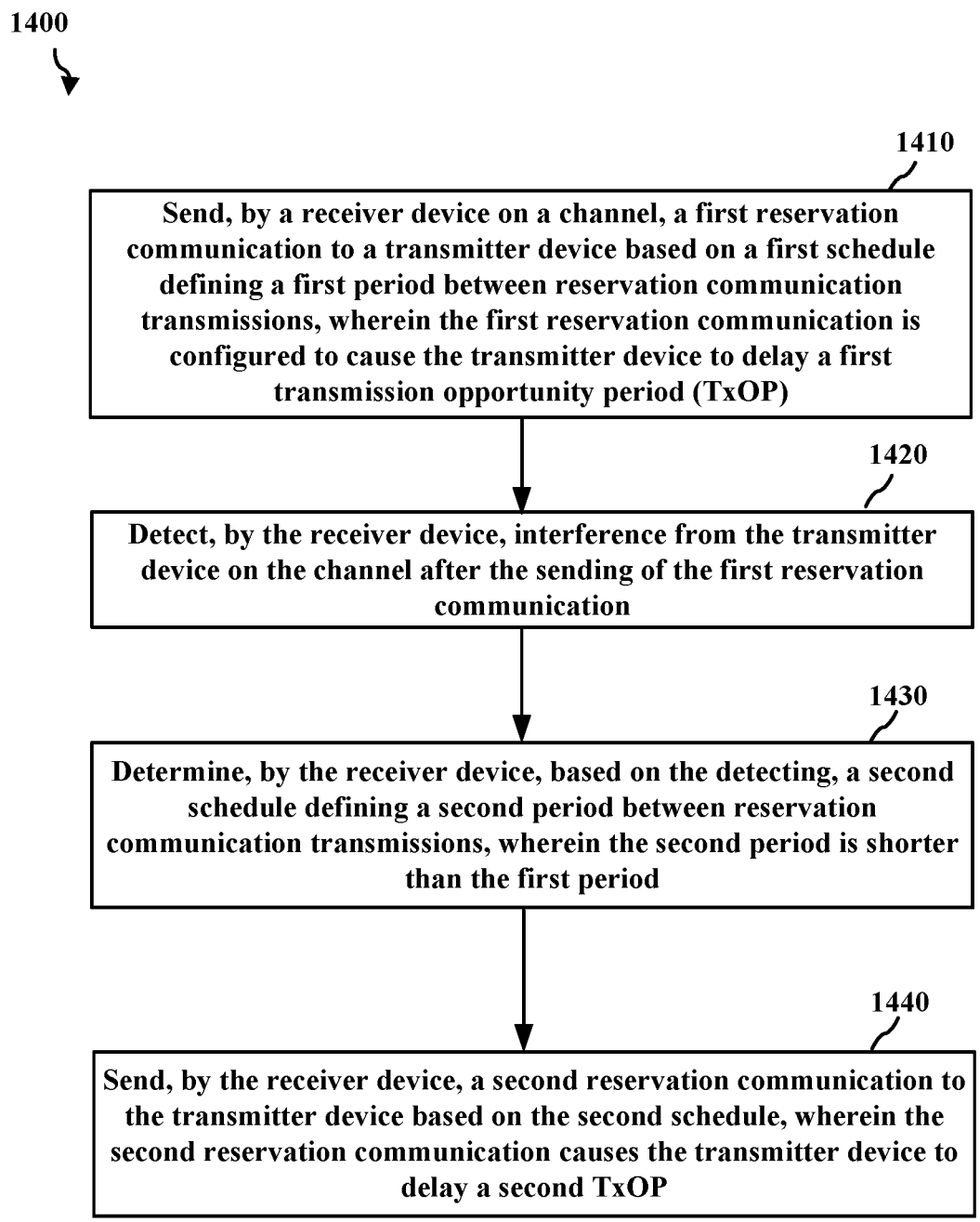
FIG. 14 is a flowchart of a third method of wireless communication.

FIG. 14 is a flowchart of a method 1400 of trigger-based joint TX-RX sensing for mmWave channel access. The method may be performed by a UE (e.g., the UE 104), which may include the memory 360 and which may be the entire UE 104 or a component of the UE 104, such as interference management component 140, the TX processor 368, the RX processor 356, and/or the controller/processor 359; the UE 706; the UE 712; the UE 1002).

At block 1410, the method 1400 may include sending, by a receiver device on a channel, a first reservation communication to a transmitter device based on a first schedule defining a first period between reservation communication transmissions, wherein the first reservation communication is configured to cause the transmitter device to delay a first transmission opportunity period (TxOP). For example, the collision prevention component 142 may periodically send the reservation communication 720 to the gNB 708 according to a first schedule. In some aspects, sending the first reservation communication may include sending during a first contiguous contention window at the transmitter device, wherein a duration of the first contiguous contention window is less than a duration of the first period. For example, the collision prevention component 142 may send the reservation communications 720 to the gNB 708 according to a first schedule during a first contiguous contention window at the gNB 708 having a duration lesser than the period between the reservation communications 720.

Accordingly, the UE 104, the UE 706, the UE 712, the UE 1002, the TX processor 368, the RX processor 356, and/or the controller/processor 359 executing the collision prevention component 142 may provide means for sending, by a receiver device on a channel, a first reservation communication to a transmitter device based on a first schedule defining a first period between reservation communication transmissions, wherein the first reservation communication is configured to cause the transmitter device to delay a first transmission opportunity period (TxOP).

At block 1420, the method 1400 may include detecting, by the receiver device, interference from the transmitter device on the channel after the sending of the first reservation communication. For example, the interference detection component 141 may detect the interference 718 at the reception component 1011.

Accordingly, the UE 104, the UE 706, the UE 712, the UE 1002, the TX processor 368, the RX processor 356, and/or the controller/processor 359 executing the interference detection component 141 may provide means for detecting, by the receiver device, interference from the transmitter device on the channel after the sending of the first reservation communication.

At block 1430, the method 1400 may include determining, by the receiver device, based on the detecting, a second schedule defining a second period between reservation communication transmissions, wherein the second period is shorter than the first period. For example, the collision prevent component 142(1) may determine an updated schedule that sends the reservation communication 720 at an increased frequency.

Accordingly, the UE 104, the UE 706, the UE 712, the UE 1002, the TX processor 368, the RX processor 356, and/or the controller/processor 359 executing the collision prevent component 142 may provide means for determining, by the receiver device, based on the detecting, a second schedule defining a second period between reservation communication transmissions, wherein the second period is shorter than the first period.

At block 1440, the method 1400 may include sending, by the receiver device, a second reservation communication to the transmitter device based on the second schedule, wherein the second reservation communication causes the transmitter device to delay a second TxOP. For example, the UE 706 may send the reservation communications 720 according to the increased frequency of the updated schedule. In some aspects, sending the second reservation communication may include sending the second reservation communication during a second contiguous contention window at the transmitter device, wherein a duration of the first contiguous contention window is equal to a duration of the second contiguous contention window. For example, the collision prevention component 142 may send the reservation communications 720 to the gNB 708 during a second contiguous contention window at the gNB 708 having a duration equal to an earlier contiguous window at the gNB 708.

Accordingly, the UE 104, the UE 706, the UE 712, the UE 1002, the TX processor 368, the RX processor 356, and/or the controller/processor 359 executing the collision prevent component 142 may provide means for sending, by the receiver device, a second reservation communication to the transmitter device based on the second schedule, wherein the second reservation communication causes the transmitter device to delay a second TxOP.

The present disclosure further provides an apparatus that can include components that perform each of the blocks of the algorithm in the aforementioned flowcharts of FIGS. 12-14. As such, each block in the aforementioned flowcharts of FIGS. 12-14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In view of the foregoing, enabling trigger-based joint TX-RX sensing for mmWave channel access provides rigorous protection for on-going transmissions and efficient operation. By permitting the UE to send trigger-based reservation communications and/or implement shorter contention windows, the wireless devices no longer suffer from long wait times for packet transmission opportunities, high latencies, and low throughputs, while meeting fair access and co-existence expectations.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:

sending, to a first user equipment served by the base station and after performing a listen-before-talk (LBT) procedure, a pre-grant transmission via a serving cell of the base station, the pre-grant transmission including a sequence that identifies the pre-grant transmission, the pre-grant transmission indicating that the serving cell intends to schedule a future communication with the first user equipment, wherein the pre-grant transmission is configured to trigger a reservation communication from a second user equipment served by a second base station and having a communication interfered with by the pre-grant transmission, wherein the reservation communication includes a sequence indicating an occurrence of a collision on a shared channel;

monitoring, via the serving cell, for receipt of a pre-grant acknowledgment communication from the first user equipment or the reservation communication from the second user equipment in response to the second user equipment detecting signal interference from the pre-grant transmission, wherein monitoring for receipt of the pre-grant acknowledgment communication or the reservation communication comprises monitoring for reception of one or more signals having an energy level greater than a threshold during a contiguous window of a plurality of contention slots; and determining, by the serving cell, whether to perform the future communication with the first user equipment based at least in part on the monitoring, and delaying or canceling the future communication in response to receipt of the reservation communication.

2. The method of claim 1, wherein sending the pre-grant transmission comprises sending the pre-grant transmission to cause a spike in energy detectable by the first user equipment or the second user equipment.

3. The method of claim 1, wherein the monitoring further comprises:
periodically receiving the reservation communication over a period of time associated with a second LBT process; continuously receiving the reservation communication within the period of time associated with the second LBT process; or receiving a plurality of reservation communications within the period of time associated with the second LBT process.

4. The method of claim 1, wherein the monitoring further comprises: periodically receiving the reservation communication over a period of time overlapping with receiving the pre-grant acknowledgment communication; continuously receiving the reservation communication within the period of time overlapping with receiving the pre-grant acknowledgment communication; or receiving a plurality of reservation communications within the period of time overlapping with receiving the pre-grant acknowledgment communication.

5. The method of claim 1, further comprising: receiving, from the first user equipment, a negative acknowledgment communication indicating that the first user equipment has detected a collision.

6. The method of claim 1, wherein the reservation communication is a first reservation, and further comprising: allocating a set of resources periodically across a plurality of slots to receive a second reservation communication from the first user equipment.

7. The method of claim 1, wherein determining whether to perform the future communication comprises determining whether to send downlink data to the first user equipment based at least in part on the monitoring.

8. The method of claim 7, wherein performing the monitoring further comprises performing a first listen before talk (LBT) procedure of a first category subsequent to sending the pre-grant transmission, and further comprising performing, prior to sending the downlink data, a second LBT process of a second category.

9. The method of claim 8, wherein the second category is LBT without a random backoff.

10. The method of claim 1, wherein determining whether to perform the future communication comprises determining whether to send the first user equipment an uplink grant indicating permission to transmit uplink data based at least in part on the monitoring.

11. The method of claim 10, further comprising performing a LBT process prior to sending the pre-grant transmission.

12. A base station for wireless communication, comprising:
a memory storing computer-executable instructions; and
at least one processor coupled with the memory and configured to execute the computer-executable instructions to:
send, to a first user equipment served by the base station and after performing a listen-before-talk (LBT) procedure, a pre-grant transmission via a serving cell of the base station, the pre-grant transmission including a sequence that identifies the pre-grant transmission, the pre-grant transmission indicating that the serving cell intends to schedule a future communication with the first user equipment, wherein the pre-grant transmission is configured to trigger a reservation communication from a second user equipment served by a second base station and having a communication interfered with by the pre-grant transmission, wherein the reservation communication includes a sequence indicating an occurrence of a collision on a shared channel;
monitor, via the serving cell, for receipt of a pre-grant acknowledgment communication from the first user equipment or the reservation communication from the second user equipment in response to the second user equipment detecting signal interference from the pre-grant transmission, wherein to monitor the at least one processor is further configured to execute the computer-executable instructions to monitor for reception of one or more signals having an energy level greater than a threshold during a contiguous window of a plurality of contention slots; and
determine, by the serving cell, whether to perform the future communication with the first user equipment based at least in part on the monitoring, and delaying or canceling the future communication in response to receipt of the reservation communication.

13. A method of wireless communication at a first user equipment, comprising:
monitoring, via a receiver, for one or more downlink transmissions from a first base station serving the first user equipment;
detecting, during the monitoring, interference from a pre-grant communication transmitted from a second base station to a second user equipment served by the second base station, the pre-grant communication including a sequence identifying a future communication between the a second base station and the a-second user equipment; and
transmitting, via a transmitter and during a listen-before-talk (LBT) performed by the second base station, a reservation communication to the second base station in response to the pre-grant communication, wherein the reservation communication causes the second base station to delay or cancel the future communication in response to receipt of the reservation communication, wherein the reservation communication includes a sequence indicating an occurrence of a collision on a shared channel.

14. The method of claim 13, wherein transmitting the reservation communication comprises sending the reservation communication to cause a spike in energy detectable by the second base station.

15. The method of claim 13, wherein detecting interference associated with the pre-grant communication comprises detecting a spike in energy on a medium.

16. The method of claim 13, further comprising: tuning away from the monitoring based on the interference; and sending, to the first base station, a negative acknowledgment communication indicating a collision has been detected.

17. The method of claim 13, further comprising:
periodically sending the reservation communication over a period of time; continuously sending the reservation communication within the period of time; or sending a plurality of reservation communications within the period of time.

18. A first user equipment for wireless communication, comprising:
a memory storing computer-executable instructions; and
at least one processor coupled with the memory and configured to execute the computer-executable instructions to:
monitor, via a receiver, for one or more downlink transmissions from a first base station serving the first user equipment;
detect, during the monitoring, interference from a pre-grant communication transmitted from a second base station to a second user equipment served by the second base station, the pre-grant communication including a sequence identifying a future communication between the second base station and the second user equipment; and
transmit, via a transmitter and during a listen-before-talk (LBT) performed by the second base station, a reservation communication to the second base station in response to the pre-grant communication, wherein the reservation communication causes the second base station to delay or cancel the future communication in response to receipt of the reservation communication, wherein the reservation communication includes a sequence indicating an occurrence of a collision on a shared channel.

19. The first user equipment of claim 18, wherein the reservation communication is transmitted to cause a spike in energy detectable by the second base station.

20. The first user equipment of claim 18, wherein the interference associated with the pre-grant communication is detected based on a spike in energy on a medium.

21. The first user equipment of claim 18, wherein the at least one processor is further configured to execute the computer-executable instructions to: tune away from the monitoring based on the interference; and send, to the first base station, a negative acknowledgment communication indicating a collision has been detected.

22. The first user equipment of claim 18, wherein the at least one processor is further configured to execute the computer-executable instructions to: periodically send the reservation communication over a period of time; continuously send the reservation communication within the period of time; or send a plurality of reservation communications within the period of time.

* * * * *